(12) United States Patent
Volpi et al.

(10) Patent No.: US 10,185,853 B2
(45) Date of Patent: *Jan. 22, 2019

(54) INTERROGATOR AND INTERROGATION SYSTEM EMPLOYING THE SAME

(71) Applicant: Medical IP Holdings, LP, Addison, TX (US)

(72) Inventors: John P. Volpi, Garland, TX (US); Logan Scott, Fort Collins, CO (US); Eric McMurry, Richardson, TX (US)

(73) Assignee: Medical IP Holdings, LP, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,131

(22) Filed: Jul. 11, 2017

(65) Prior Publication Data

US 2017/0316236 A1    Nov. 2, 2017

Related U.S. Application Data

(63) Continuation of application No. 14/611,425, filed on Feb. 2, 2015, now Pat. No. 9,710,683, which is a continuation of application No. 11/071,652, filed on Mar. 3, 2005, now Pat. No. 8,948,279.

(60) Provisional application No. 60/549,853, filed on Mar. 3, 2004.

(51) Int. Cl.
*G06K 7/10* (2006.01)
*G06K 7/00* (2006.01)
*G06K 17/00* (2006.01)

(52) U.S. Cl.
CPC ....... *G06K 7/10366* (2013.01); *G06K 7/0008* (2013.01); *G06K 2017/009* (2013.01); *G06K 2017/0051* (2013.01)

(58) Field of Classification Search
CPC .............. G06K 7/1036; G06K 7/0008; G06K 2017/0051; G06K 2017/009
USPC ........................................ 375/260; 340/10.1
See application file for complete search history.

(56) References Cited

U.S. PATENT DOCUMENTS

| | | | | |
|---|---|---|---|---|
| 7,671,744 B2* | 3/2010 | Volpi | ...................... | G01S 13/66 340/572.1 |
| 8,174,366 B2* | 5/2012 | Volpi | ...................... | G01S 13/66 340/10.3 |
| 8,542,717 B2* | 9/2013 | Volpi | ................... | G06K 7/0008 375/147 |
| 8,948,279 B2* | 2/2015 | Volpi | ................... | G06K 7/0008 340/10.1 |
| 9,710,683 B2* | 7/2017 | Volpi | ................. | G06K 7/10366 |

* cited by examiner

Primary Examiner — Michael Neff
(74) Attorney, Agent, or Firm — Bosibrun Hofman, PLLC

(57) ABSTRACT

A control and processing system for use with an interrogator and an interrogation system employing the same. In one embodiment, the control and processing system includes a correlation subsystem having a correlator that correlates a reference code with a reply code from a radio frequency identification (RFID) tag and provides a correlation signal therefrom. The control and processing system also includes a decision subsystem that verifies a presence of the RFID tag as a function of the correlation signal.

20 Claims, 25 Drawing Sheets

INTERROGATOR AND INTERROGATION SYSTEM EMPLOYING THE SAME

This is a Continuation of application Ser. No. 14/611,425, entitled "Interrogator and Interrogation System Employing the Same," filed on Feb. 2, 2015 currently allowed, which is a Continuation of application Ser. No. 11/071,652, entitled "Interrogator and Interrogation System Employing the Same," filed on Mar. 3, 2005, now U.S. Pat. No. 8,948,279, which claims the benefit of U.S. Provisional Application No. 60/549,853, entitled "An Interrogator and Interrogation System Employing the Same," filed on Mar. 3, 2004, which are incorporated herein by reference.

TECHNICAL FIELD

The present invention is directed, in general, to communication systems and, more specifically, to an interrogator, method of discerning radio frequency identification (RFID) objects, and an interrogation system employing the same.

BACKGROUND

Asset tracking for the purposes of inventory control or the like is employed in a multitude of industry sectors such as in the food industry, apparel markets and any number of manufacturing sectors, to name a few. In many instances, a bar coded tag or radio frequency identification (RFID) tag is affixed to the asset and a reader interrogates the item to read the tag and ultimately to account for the asset being tracked. Although not readily adopted, an analogous system may be employed in a medical environment to track equipment such as an Electrocardiogram (EKG) machine or other modular patient monitoring equipment.

Of particular note is a surgical environment in which for preparation for surgery a previously sterilized instrument kit of surgical instruments and disposable items (collectively referred to as surgical items) is brought into a surgical suite. The instrument kit contains an assortment of surgical items including hemostats, clamps, forceps, scissors, sponges, and the like, based on the type of surgery to be performed. Typically, a scrub nurse removes the surgical items from the kit and arranges them on a back table located behind the operating table. The surgical items are organized in rows on rolled toweling for ease of access and handling by a surgeon and supporting team. During the course of a surgical procedure, the surgical items are often positioned on a "Mayo" stand proximate the operating table, while the unused surgical items remain on the back table. During the course of and at the conclusion of the surgery, all of the surgical items must be carefully counted to, among other things, avoid leaving any surgical items in a patient.

In view of the consequences, surgical items are typically counted at least three times during the course of a surgical procedure. The first count is performed prior to the start of the procedure; the second count is performed prior to a closure of the patient; the third count is performed at the conclusion of the procedure. In many instances such as when more than one surgical team is assigned to a procedure, many more counts of the surgical items, often involving different personnel (e.g., a circulating nurse and a scrub nurse), are performed. As a matter of fact, the Association of PeriOperative Registered Nurses (AORN) advocates four counts of the surgical items as part of its recommended practices for surgical procedures. Additionally, to keep track of the counts of the surgical items, rudimentary systems such as visual records scribbled on whiteboards or other more progressive computer tallying systems to designate the count of the surgical items are often employed.

In common practice, access to and from an operating room in the surgical suite is restricted during the counting process thereby resulting in a detention of valuable professional personnel. A discrepancy in the count must be resolved by additional counts, physical examination of the patient or x-ray examination, if necessary. Although it is unusual for a discrepancy in the count to result from a surgical item remaining in the patient, counting and recounting occurs in every surgical procedure and the repercussions associated with the loss of a surgical item is of grave concern to a medical facility and the medical professionals.

Thus, the multiple manual counting of surgical items is time consuming, ties up key professional personnel, contributes to surgical suite down time, distracts personnel from the surgical procedure, lengthens the time the patient is exposed to anesthesia leading to an increase in mortality and morbidity risk, is generally distasteful to all involved, and still results in errors wherein materials are left in the patient. It should be quite understandable that the average cost overruns of such delays associated with the personnel, capital equipment and the surgical suite itself can run into the tens of thousands of dollars per procedure. On an annual basis, the loss of productivity associated with the surgical suite is quite sizeable and should be addressed to bolster the bottom line of a medical facility.

Even with the degree of caution cited above, the problem associated with the loss of surgical items, especially surgical items retained within patients, is a serious one and has a significant influence on the costs of malpractice insurance. As a matter of fact, retained foreign bodies within a patient is one of the most prevalent categories of malpractice claims and the most common retained foreign body is a sponge. In accordance therewith, there is a diagnosis known as "gossypiboma" (wherein gossypium is Latin for cotton and boma is Swahili for place of concealment) for the retention of a sponge-like foreign body in a patient. The medical literature is scattered with reports of presentations of retained sponges found days, months, or even years after a surgical procedure.

The sponge is typically made of gauze-like material with dimensions often covering a four-inch square or a two-inch by four-inch rectangle. At one time sponges were commonly made of cotton, but now a number of filament materials are used. Occasionally, a filament of radiopaque material [e.g., barium sulfate ($BaSO_4$)] is woven into the surgical sponge, or a tab of that material is attached to the surgical sponge. The filament or tab is provided to produce a distinct signature on an x-ray machine for the purpose of determining if a sponge is present in the patient. While this is generally effective, even these filaments or tabs are not 100% effective in aiding the location of the sponges. Different researchers report that x-ray methods to supplement manual counting are fallible.

Moreover, in cases when a sponge remains in the body for a long time, the radiopaque filament can become difficult to locate and may even conform to internal structures. Some have suggested that a computerized tomography (CT) scan can be more effective than an x-ray examination because the CT scans and ultrasonography may detect the reduced density of a sponge and its characteristic pattern of air or gas bubbles trapped within the sponge. Many radiologists have published a number of papers over the years on the problem of finding lost sponges and these are generally known in the field of medicine.

As mentioned above, there is a widespread practice in other fields for counting, tracking and accounting for items and two of the more prevalent and lowest cost approaches involve various types of bar coding and RFID techniques. As with bar coding, the RFID techniques are primarily used for automatic data capture and, to date, the technologies are generally not compatible with the counting of surgical items. A reason for the incompatibility in the medical environment for the bar coding and RFID techniques is a prerequisite to identify items covered in fluids or waste, and the exigencies associated with the sterilizing of surgical items including a readable tag.

Even in view of the foregoing limitations for the application of RFID techniques in the medical environment wherein less than ideal conditions are prevalent, RFID tags have been compatible with a number of arduous environments. In the pharmaceutical industry, for instance, RFID tags have survived manufacturing processes that require products to be sterilized for a period of time over 120 degrees Celsius. Products are autoclaved while mounted on steel racks tagged with an RFID tag such that a rack identification (ID) number and time/date stamp can be automatically collected at the beginning and end of the process as the rack travels through the autoclave on a conveyor. The RFID tags can be specified to withstand more than 1000 hours at temperatures above 120 degrees Celsius. This is just one example of how RFID tags can withstand the arduous environment including the high temperatures associated with an autoclave procedure, whereas a bar code label is unlikely to survive such treatment.

While identification tags or labels may be able to survive the difficult conditions associated with medical applications, there is yet another challenge directed to attaching an identification element to a surgical item or any small device. The RFID tags are frequently attached to devices by employing mechanical techniques or may be affixed with sewing techniques. A more common form of attachment of an RFID tag to a device is by bonding techniques including encapsulation or adhesion.

While medical device manufacturers have multiple options for bonding, critical disparities between materials may exist in areas such as biocompatibility, bond strength, curing characteristics, flexibility and gap-filling capabilities. A number of bonding materials are used in the assembly and fabrication of both disposable and reusable medical devices, many of which are certified to United States Pharmacopoeia Class VI requirements. These products include epoxies, silicones, ultraviolet curables, cyanoacrylates, and special acrylic polymer formulations.

In many instances, the toughness and versatile properties of biocompatible epoxies make them an attractive alternative. Epoxies form strong and durable bonds, fill gaps effectively and adhere well to most types of substrates. Common uses for medical epoxies include a number of applications which require sterilization compatibility such as bonding lenses in endoscopes, attaching plastic tips to tubing in disposable catheters, coating implantable prosthetic devices, bonding balloons to catheters for balloon angioplasty, and bonding diamond scalpel blades for coronary bypass surgery, to name a few. A wide range of such materials are available and some provide high strength bonds which are tough, water resistant, low in outgassing, and dimensionally stable over a temperature range of up to 600 degrees Fahrenheit. Some epoxies can withstand repeated sterilization such as autoclaving, radiation, ethylene oxide and cold (e.g., chemical) sterilization methods.

As previously mentioned, familiar applications for RFID techniques include "smart labels" in airline baggage tracking and in many stores for inventory control and for theft deterrence. In some cases, the smart labels may combine both RFID and bar coding techniques. The tags may include batteries and typically only function as read only devices or as read/write devices. Less familiar applications for RFID techniques include the inclusion of RFID tags in automobile key fobs as anti-theft devices, identification badges for employees, and RFID tags incorporated into a wrist band as an accurate and secure method of identifying and tracking prison inmates and patrons at entertainment and recreation facilities. Within the medical field, RFID tags have been proposed for tracking patients and patient files, employee identification badges, identification of blood bags, and process management within the factories of manufacturers making products for medical practice.

Typically, RFID tags without batteries (i.e., passive devices) are smaller, lighter and less expensive than those that are active devices. The passive RFID tags are typically maintenance free and can last for long periods of time. The passive RFID tags are relatively inexpensive, generally as small as an inch in length, and about an eighth of an inch in diameter when encapsulated in hermetic glass cylinders. Recent developments indicate that they will soon be even smaller. The RFID tags can be encoded with 64 or more bits of data that represent a large number of unique ID numbers (e.g., about 18,446,744,073,709,551,616 unique ID numbers). Obviously, this number of encoded data provides more than enough unique codes to identify every item used in a surgical procedure or in other environments that may benefit from asset tracking.

An important attribute of RFID interrogation systems is that a number of RFID tags should be interrogated simultaneously stemming from the signal processing associated with the techniques of impressing the identification information on the carrier signal. A related and desirable attribute is that there is not typically a minimum separation required between the RFID tags. Using an anti-collision algorithm, multiple RFID tags may be readily identifiable and, even at an extreme reading range, only minimal separation (e.g., five centimeters or less) to prevent mutual de-tuning is generally necessary. Most other identification systems, such as systems employing bar codes, usually impose that each device be interrogated separately. The ability to interrogate a plurality of closely spaced RFID tags simultaneously is desirable for applications requiring rapid interrogation of a large number of items.

In general, the sector of radio frequency identification is one of the fastest growing areas within the field of automatic identification and data collection. A reason for the proliferation of RFID systems is that RFID tags may be affixed to a variety of diverse objects (also referred to as "RFID objects") and a presence of the RFID tags may be detected without actually physically viewing or contacting the RFID tag. As a result, multiple applications have been developed for the RFID systems and more are being developed every day.

The parameters for the applications of the RFID systems vary widely, but can generally be divided into three significant categories. First, an ability to read the RFID tags rapidly. Another category revolves around an ability to read a significant number of the RFID tags simultaneously (or nearly simultaneously). A third category stems from an ability to read the RFID tags reliably at increased ranges or under conditions wherein the radio frequency signals have been substantially attenuated. While significant progress has been made in the area of reading multiple RFID tags almost simultaneously (see, for instance, U.S. Pat. No. 6,265,962 entitled "Method for Resolving Signal Collisions Between Multiple RFID Transponders in a Field," to Black, et al., issued Jul. 24, 2001, which is incorporated herein by reference), there is still room for significant improvement in the area of reading the RFID tags reliably at increased ranges or under conditions when the radio frequency signals have been substantially attenuated.

Accordingly, what is needed in the art is an interrogator, interrogation system and related method to identify and account for all types of items regardless of the environment or application that overcomes the deficiencies of the prior art.

SUMMARY OF THE INVENTION

These and other problems are generally solved or circumvented, and technical advantages are generally achieved, by advantageous embodiments of the present invention which includes an interrogator and an interrogation system employing the same. In one embodiment, the interrogator includes a control and processing system having a correlation subsystem that correlates a reference code with a reply code from a radio frequency identification (RFID) tag and provides a correlation signal therefrom. The control and processing system also includes a decision subsystem that verifies a presence of the RFID tag as a function of the correlation signal.

In another aspect, the present invention provides an interrogator including an RFID sensing subsystem that provides a reply code associated with an RFID tag and a control and processing subsystem. The control and processing subsystem includes a correlation subsystem that correlates a reference code with the reply code and provides a correlation signal therefrom. The control and processing subsystem also includes a decision subsystem that verifies a presence of the RFID tag as a function of the correlation signal. The interrogator may also include a metal sensing subsystem that provides a signal having a metal signature representing a presence of a metal object. The control and processing subsystem may be configured to discern a presence of the metal object from the signal.

In yet another aspect, the present invention provides an interrogation system including a computer system and a transceiver that transmits and receives signals for the computer system. The interrogation system also includes an interrogator having an RFID sensing subsystem that provides a reply code associated with an RFID tag of an RFID object. The interrogator also includes a control and processing subsystem having a correlation subsystem that correlates a reference code with the reply code and provides a correlation signal therefrom. The control and processing subsystem also includes a decision subsystem that verifies a presence of the RFID tag as a function of the correlation signal. The interrogator also includes a communications subsystem that communicates with the transceiver.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

DETAILED DESCRIPTION OF ILLUSTRATIVE EMBODIMENTS

Figure 1:
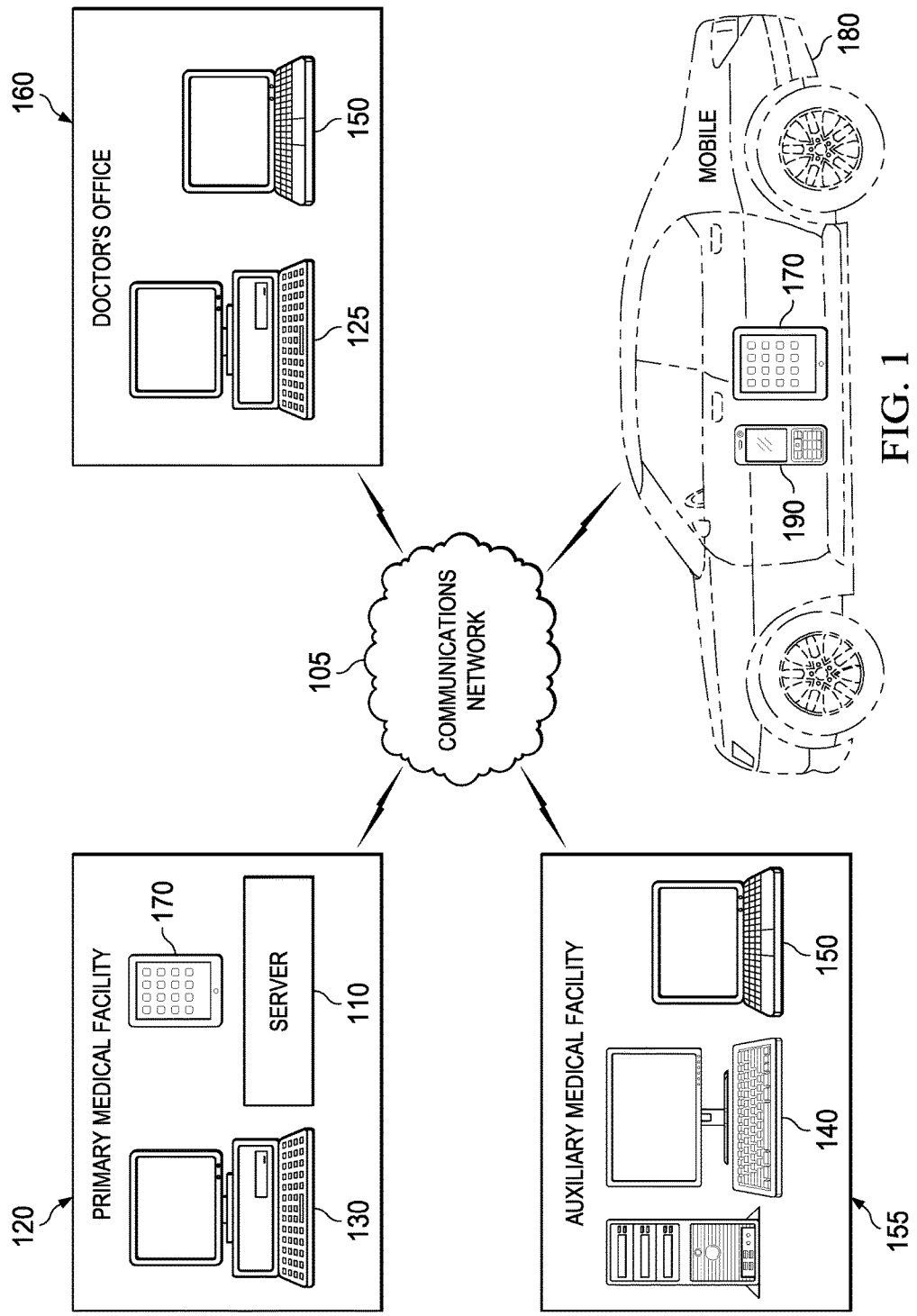
FIG. 1 illustrates a diagram of an embodiment of a communication system employable in a medical environment constructed in accordance with the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention will be described with respect to exemplary embodiments in a specific context, namely, an interrogator, methods of discerning metal objects (i.e., objects that include metal) and RFID objects (i.e., objects that include an RFID tag or radio frequency identification) and an interrogation system employing the same.

In one aspect, an interrogator constructed according to the principles of the present invention reads a reply code from an RFID tag and treats the reply code as a spreading code in the context of spread spectrum communications with the existence of the RFID tag being preferably a single data bit also in the context of spread spectrum communications. The additional gain achieved by this approach substantially expands a potential for a detection process both of an obstructed RFID tag and an RFID tag located at a greater distance from the interrogator.

In another aspect, an interrogator constructed according to the principles of the present invention can read a reply code of the RFID tag with multiple amplitude bits (e.g., at least two) so that unique characteristics of an amplitude of the reply codes are captured and can be used to increase the uniqueness associated with the RFID tag. Thus, in addition to a uniqueness of the reply code including a tag identification (ID) code section thereof, the amplitude information serves as a type of "fingerprint" for the RFID tag.

In another aspect, the interrogation system is operable in a pre-initialization stage, an initialization stage and a post initialization stage. During one of the pre-initialization stage and the initialization stage, reference codes corresponding to the reply codes of the RFID tags are logged into memory (e.g., a database) of an interrogator of the interrogation system. Thereafter and during the post initialization stage, a correlation subsystem of the interrogator correlates between the reference code and a reply code from the RFID tags (when subsequently energized by the interrogator) to enhance a detection sensitivity thereof.

In another aspect, an interrogator constructed according to the principles of the present invention may employ reference codes corresponding to reply codes for the RFID tags that are synthetically derived to attain a higher level of sensitivity therefor. As mentioned herein, amplitude information about an RFID tag can be employed to generate a reference code to correlate against incoming reply codes to detect the presence of an RFID tag. The amplitude, phase and delay (timing of a response to an excitation signal) information of a particular type of RFID tag may be employed by the interrogator to derive the synthetic reference code.

One embodiment of generating a synthetic reference code is to pre-load a logical "0" and a logical "1" for a particular class of RFID tags (see FIG. 12 for an exemplary embodiment of a logical "0" and a logical "1") wherein the preloaded information contains the unique amplitude, phase and delay information as mentioned above for that particular type of RFID tag. The preloaded information is used as individual building blocks to construct a synthetic code. During initialization, when the RFID object is typically read under docile signal conditions (i.e., high signal to noise ratio), so that it can be read in a conventional manner, the complete RFID tag code or digital signature is obtained. Further, as part of the initialization process, using the complete digital signature and the preloaded logical "0's" and logical "1's," a representation of the RFID object's response to an RFID query by the interrogator is synthetically constructed one bit at a time, starting with a bit of the digital signature (a "0" or a "1") and thereby establishing a corresponding bit of the synthetic code (using logical "0s" and logical "1s").

In a like manner, another bit of the synthetic code is determined and if contiguous to the other bit, is appended to the first bit described above. The process continues on a bit by bit basis, until a synthetic code is generated corresponding to at least a portion of the digital signature. In some instances, it will be desired to construct the entire anticipated response of the RFID object synthetically and this invention comprehends those instances where the entire RFID response as well as only a portion of the RFID response is generated synthetically. The preload of the logical "1's" and "0's" can occur as part of each initialization stage, or they can be contained in non-volatile form within the memory of the control and processing subsystem. They will typically be entered and updated via the communications subsystem of the interrogator. The interrogator may contain one or more such sets of these elements. In addition to creating the reference codes synthetically or partially creating the reference codes synthetically, the interrogator may create the reference code directly by scanning the RFID tag during an initialization stage.

In another aspect, the interrogator constructed according to the principles of the present invention employs noncoherent integration of multiple sequences of reference codes and reply codes from an RFID tag. In accordance therewith, reference bits (of the reference code) and sample bits (corresponding to the reply code) are latched and correlated bit-for-bit within a correlator of a correlation subsystem of the interrogator. A signal from the correlator is processed by a correlation threshold sense, a threshold of which may be altered to refine a threshold of the correlation operation. An output of the correlation threshold sense is then input to a summer, which after multiple transmissions and detections is input to a decision subsystem of the interrogator for an ultimate determination of a presence of an RFID tag.

In another aspect, an interrogator constructed according to the principles of the present invention includes a correlation subsystem that performs a correlation between a reference code and on portions of a reply code from the RFID tag and provide an indication of a presence of the RFID tag. For example, correlating on the preamble of the reply code provides a nine decibel increase in detection sensitivity (e.g., for an eight bit preamble). While employing the preamble alone does not uniquely identify an RFID tag, it does, with a relatively high probability, indicate the presence of an RFID tag. In accordance therewith, the reply codes for multiple RFID tags may have the same preamble and the interrogator correlates a reference code against the preamble of the reply code to indicate the presence of the RFID tag. The apriori knowledge of even the preamble further enhances a correlation operation to increase a sensitivity of the interrogator. Of course, the correlation subsystem may also employ a reference code to correlate against the entire reply code of the RFID tag depending on the particular application. Thus, the interrogator employs a discriminating correlation technique to correlate portions of a reply code from an RFID tag. The discriminating correlation technique may also employ hierarchal detection techniques to exploit portions of the reply code of an RFID tag to iteratively detect a presence thereof.

In another aspect, an interrogator constructed according to the principles of the present invention includes a decision subsystem embodied in a threshold detector. A threshold detector provides at least two logical outputs, namely, a logical "1" and a logical "0." Typically, the output of the threshold detector is a predetermined logical "1" or "0" if a threshold criteria is passed, and an alternate logical "0" or "1" if the threshold criteria is not passed. In accordance with the selected criteria, the interrogator can provide, via a user interface, an RFID tag detected, RFID tag not detected, and an indeterminate indication (when at least a third state is available). In the latter case, a deeper and more thorough detection mode can be employed to determine the presence of an RFID tag, lack thereof, or an indeterminate condition. As a result, the interrogator can detect readily available RFID tags without employing the additional overhead necessary to detect obscured RFID tags.

In another aspect, an interrogator constructed according to the principles of the present invention includes a correlation subsystem with a single correlator or multiple correlators. In the latter case, the multiple correlators can be used to detect multiple RFID tags simultaneously and, in that instance, the multiple correlators typically operate independently. Alternatively, multiple correlators can be assigned to find a single RFID tag wherein each correlator can be given a slightly different area of time or phase space to search. In other words, the multiple correlators are assigned to an RFID tag offset in code space and can search in multiple locations in code space (i.e, bit or chip space as opposed to time space). For this embodiment, a clocking rate greater than the data rate is preferable. The higher rate is often referred to as a chipping rate so that moving plus or minus a chip can be used to better align the correlators on the data for enhanced signal processing gain. The chipping rate generally refers to a higher rate wherein a chip represents a fraction of a bit and, with "J" contiguous bits occupying the same time as one data bit, the chipping rate is "J" times the data rate.

In another aspect, an interrogator constructed according to the principles of the present invention includes multiple antennas to obtain additional gain from diversity. In accordance therewith, different correlators of a correlation subsystem may be assigned to specific antennas. As a result, the interrogator can benefit from spatial diversity, polarization diversity, angular diversity and time diversity.

In the discussion that follows, the principles of the present invention will be described with respect to a medical environment. Those skilled in the art, however, should recognize that the principles of the present invention are applicable to other fields such as supply chain management systems in the retail industry.

Referring initially to FIG. 1, illustrated is a diagram of an embodiment of a communication system employable in a medical environment constructed in accordance with the principles of the present invention. The communication system is configured to distribute, collect and process information across a communications network 105 that may include a Local Area Network (LAN), a Wide Area Network (WAN), an Intranet, an Extranet, the Internet, the World Wide Web, the Public Switched Telephone Network (PSTN), future extensions of these (e.g., the Internet 2), or a combination thereof. For purposes of the present invention, the World Wide Web is defined as all the resources and users on the Internet that are generally using the Hypertext Transfer Protocol (HTTP). In one embodiment of the present invention, the communication system communicates to each device connected thereto using Transmission Control Protocol/Internet Protocol (TCP/IP).

TCP/IP is a two-layered protocol. The higher layer, Transmission Control Protocol (TCP), manages the assembling of a message or file into smaller packets that are transmitted over the communications network 105 and received by a TCP layer that reassembles the packets into the original message. The lower layer, Internet Protocol (IP), handles the address part of each packet so that it gets to the right destination. Each gateway computer on the communication system checks the address to determine where to forward the message. Even though some packets from the same message are routed differently than others, the packets will be reassembled at the destination.

TCP/IP uses the client/server model of communication in which a computer user (a client) requests and is provided a service (such as sending a Web page) by another computer (a server) in the communication system. TCP/IP communication is primarily point-to-point, meaning each communication is from one point (or host computer) in the communication system to another point or host computer. TCP/IP and the higher-level applications that employ TCP/IP are collectively said to be "stateless" because each client's request is considered a new request unrelated to any previous one (unlike ordinary phone conversations that require a dedicated connection for the call duration). Being stateless frees the network paths so that everyone can use the paths continuously. It should be understood that the TCP layer itself is not considered stateless as far as any one message is concerned; the connection remains in place until all packets in a message have been received.

Internet users are familiar with the even higher layer application protocols that use TCP/IP to get to the Internet. The higher level application protocols include the World Wide Web's Hypertext Transfer Protocol (HTTP), the File Transfer Protocol (FTP), Telnet (a command and protocol that allows users to logon to remote computers), and the Simple Mail Transfer Protocol (SMTP). These and other protocols are often packaged together with TCP/IP.

Personal computer users usually access the Internet through the Serial Line Internet Protocol (SLIP) or the Point-to-Point Protocol (PPP). These protocols encapsulate the IP packets such that the packets can be sent over a dial-up phone connection to an access provider's connection device such as a conventional modem.

Protocols related to TCP/IP include the User Datagram Protocol (UDP), the Internet Control Message Protocol (ICMP), the Interior Gateway Protocol (IGP), the Exterior Gateway Protocol (EGP) and the Border Gateway Protocol (BGP). Depending on the circumstance, the UDP may be used instead of TCP for special network communication purposes. The aforementioned protocols, namely, ICMP, IGP, EGP and BGP, are often used by network host computers for exchanging router information.

Besides the Internet, TCP/IP may also be employed as the communication protocol in the private networks called Intranets and Extranets. An Intranet is a private network that is contained within an enterprise (such as an organization's office building). The Intranet may consist of many interlinked LANs and use leased lines in a WAN. Typically, an Intranet includes connections through one or more gateway computers (not shown) to the outside Internet. The main purpose of an Intranet is to share organizational information and computing resources among employees. An Intranet can also be used to facilitate working in groups and for teleconferences.

An Intranet typically uses TCP/IP, HTTP and other Internet protocols and in general looks like a private version of the Internet. With tunneling, organizations can send private messages through the public network, using the public network with special encryption/decryption and other security safeguards to connect one part of the Intranet to another.

An Extranet is a private network that uses the Internet protocols and may use the public network to securely share part of an organization's information or operations with suppliers, vendors, partners, customers, or other medical organizations. An Extranet can be viewed as part of an organization's Intranet that is extended to users outside the organization. Just like the Internet, an Extranet also uses HTML, HTTP, SMTP and other Internet protocols.

An Extranet also requires security and privacy provided by the use of firewalls. Firewalls are typically servers that have the ability to screen messages in both directions so that security is maintained. Firewall servers use digital certificates or similar means of user authentication, encryption of messages, and the use of virtual private networks (VPNs) that tunnel through the public network.

A medical organization can use an Extranet to exchange large volumes of data using Electronic Data Interchange (EDI) and share information between facilities associated therewith. The Extranet can also be employed to allow an organization to collaborate with other organizations on joint development efforts and jointly develop and jointly use training programs. Via the Extranet, an organization can also provide or access services provided by one organization to a group of other organizations, such as a medical record management application managed by one organization on behalf of the medical organization, and share information of common interest exclusively with partner organizations.

Within the medical environment of the communication system is a server 110 located at a primary medical facility 120 that includes systems that allow the server 110 to receive requests, perform specific tasks, retrieve and update information in at least one database and respond to requests sent over the communication system to the server 110. In other embodiments, the communication system may include multiple servers, each performing specific tasks, performing the same tasks, acting as redundant systems or acting as database sites.

In another embodiment of the present invention, the server 110 may be an application server. An application server is a computer in a distributed network containing specialized programs that provide the business logic for at least one application program located somewhere within the communication system. The application server is frequently viewed as part of a three-tier application, consisting of a graphical user interface (GUI) server, an application (business logic) server, and a database and a transaction server. The first-tier of the application, also called "front-end," is usually located in a client computer such as a personal computer (PC) or a workstation and may include a Web browser-based graphical user interface. The second-tier is the business logic application or set of applications and can be located on a LAN or an Intranet server.

The third-tier of the application, also called "back-end," is the database and transaction server and may be located on a mainframe or a large server. Older, legacy databases and transaction management applications are part of the back-end or third-tier. The application server is the middleman between the browser-based front-ends and the back-end databases and legacy systems.

In many instances, the application server is combined with or works with a Web server and is called a "Web application server." The Web browser supports an easy-to-create HTML-based front-end for the user. The Web server provides several different ways to forward a request to an application server and to send a modified or new Web page to the user. These approaches include the Common Gateway Interface (CGI), FastCGI, Microsoft's Active Server Page (ASP) and the Java Server Page (JSP). In some cases, the Web application servers also support request "brokering" interfaces such as CORBA's Internet Inter-ORB Protocol (IIOP).

The communication system also includes conventional personal computers (PCs) 125, workstations 130, office computer systems 140 and laptop computers 150. In other embodiments, the communication system may include any number of PCs 125, workstations 130, office computer systems 140 and laptop computers 150. In one embodiment of the present invention, the PCs 125, the workstation 130, the office computer system 140 and the laptop computers 150 are client computer systems. A client computer system includes a user interface that allows the user to access information, issue requests and perform functions related to the server 110. In another embodiment, the office computer system 140 may be configured as a second-tier type computer system. For illustrative purposes only, the PCs 125, the workstation 130, the office computer system 140 and the laptop computers 150 are located in ones of the primary medical facility 120, auxiliary medical facility 155 and doctor's office 160 as shown.

In the illustrated embodiment, the communication system also includes a handheld device 170 such as a personal digital assistant (PDA) or a tablet PC. A PDA is a term used for any small mobile hand-held device that provides, in part, computing, information storage and retrieval capabilities. PDAs are often used for keeping schedules, calendars, address book information and medical information (examples of PDAs include Hewlett-Packard's Palmtop™ and 3Com's PalmPilot™). A tablet PC is a compact device similar to a laptop computer but with a handwriting recognition capability (examples of tablet PCs include Compact TC1000 and ViewSonic V1100).

Most PDAs have a small keyboard and some PDAs have an electronically sensitive pad on which handwriting can be received and recognized. Apple's Newton™, which has been withdrawn from the market, was the first widely-sold PDA that accepted handwriting. Many applications have been written for PDAs including network programs and Internet access programs. PDAs are increasingly combined with telephones and paging systems for wireless communications. Some PDAs offer a variation of the Microsoft Windows™ operating system called Windows CE™. Other PDA products use a proprietary operating system, such as PalmOS™ or third party operating systems.

An individually addressable vehicle (IAV) 180 such as an ambulance is also located within the communication system. The IAV 180 can include any type of vehicle capable of having a computer with a wireless network receiver and/or transmitter that is individually addressable. For example, an ambulance containing an Internet terminal is an IAV or a computer with a wireless receiver/transmitter and sensors that transmits patient information falls within the class of IAVs.

In the illustrated embodiment, the IAV 180 can send requests to the server 110 within the communication system to request information or perform specific functions, such as retrieving information related to the location of the vehicle or general patient information. The IAV 180 may include a display (not shown) and an input device (not shown) such as push buttons, a touch screen or a combination of the two to facilitate user interface therewith.

A mobile telephone 190 may also be included in the communication system. The mobile telephone 190 includes a display capable of showing information retrievable from the communication system. The mobile telephone 190 can send and retrieve information from the server 110 and perform specialized tasks associated with the capabilities of a mobile telephone with network capabilities. In one embodiment, the mobile telephone 190 is capable of accessing Web pages, traversing the Internet and displaying information associated with Web pages on its display.

One skilled in the pertinent art should know that the principles of the present invention are not limited for use with the types of devices described above. In other embodiments, the communication system may include individually accessible electronic devices (IAEDs). IAEDs are electronic devices having a network interface that are individually addressable on a network. For example, medical equipment in a medical facility connected to a network having a unique network address is representative of an IAED.

One skilled in the pertinent art should also know that the principles of the present invention may be employed via conventional hardwired or wireless communications networks. For instance, a PDA 170 within the primary medical facility 120 may communicate patient information to the workstation 130 via a wireless link compatible with a Bluetooth communications environment as defined in the Bluetooth Specification, Version 1.1, or an IEEE 802.11 communications environment as defined in the Institute of Electronic and Electrical Engineers Specification, Section 802.11, both of which are herein incorporated by reference in their entirety. Of course, other existing or future wireless specifications including those employing a proprietary system may also be used. The workstation 130 may then download the information to the server 110 via a hardwired connection. Of course, the networks within the medical facilities and the communications network 105 itself may include hardwired and wireless segments. It should also be clear that the principles of the present invention are not limited to a communication system in a medical environment. For example, the principles of the present invention may be employed in conjunction with supply chain applications for the retail industry.

For a better understanding of communication systems and networks in general, see "Wireless Communications, Principles and Practice," by Theodore S. Rappaport, Prentice Hall PTR, 1996, "Microwave Mobile Communications," edited by William C. Jakes, IEEE Communications Society, 1993, and "Digital Communications," $3^{rd}$ Edition, by John C. Proakis, McGraw-Hill, Inc., 1995, all of which are herein incorporated by reference in their entirety. For a better understanding of communication systems including antenna design and communications, etc., see "Antenna Engineering Handbook," by Richard Johnson and Henry Jasik, McGraw-Hill, Inc., 1992, and "Wideband Wireless Digital Communications," by Andreas F. Molisch, Pearson Education, 2000, which are also herein incorporated by reference in their entirety.

Figure 2:
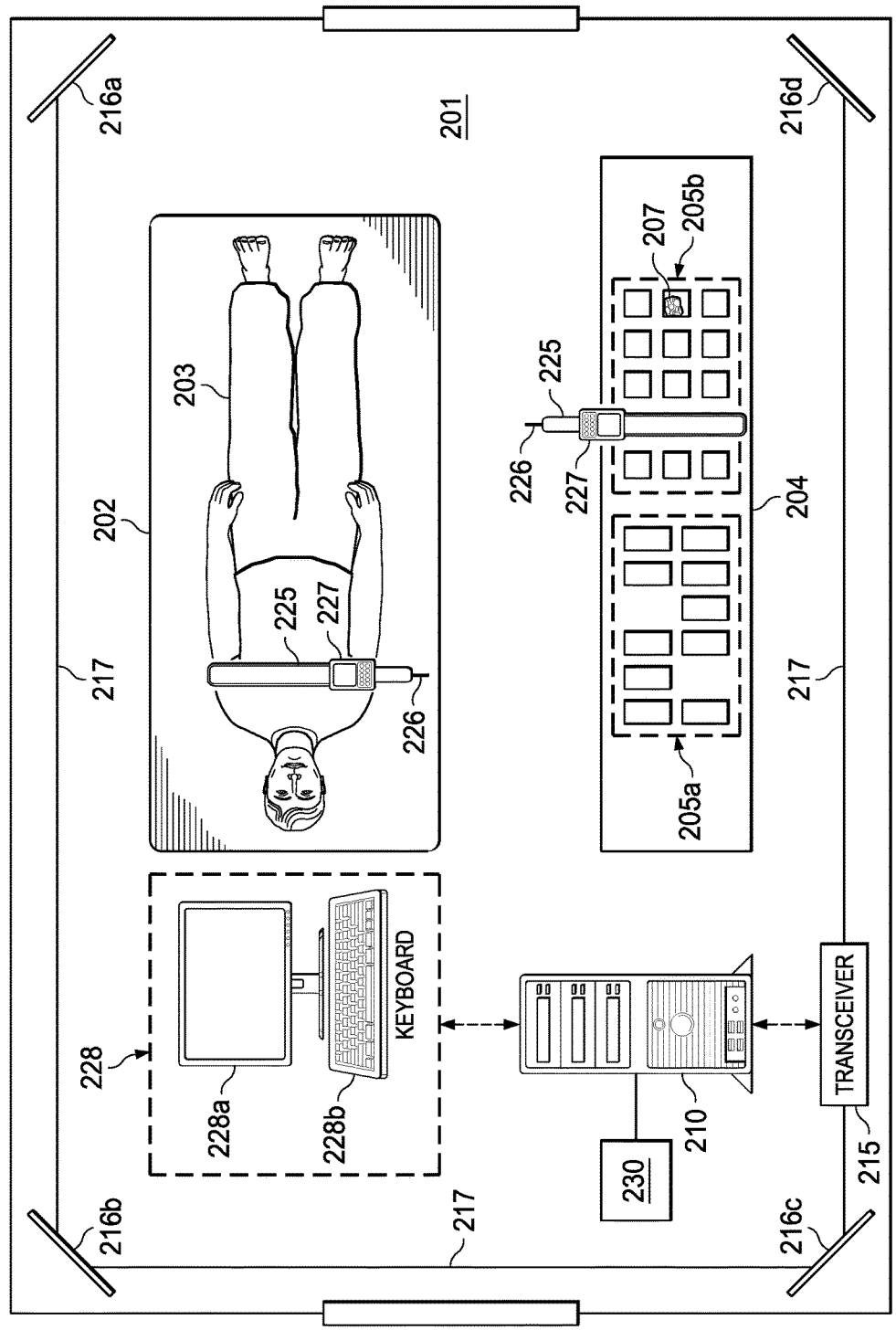
FIG. 2 illustrates a pictorial diagram of an embodiment of an interrogation system employable within an operating room of a medical facility and constructed in accordance with the principles of the present invention.

Turning now to FIG. 2, illustrated is a pictorial diagram of an embodiment of an interrogation system employable within an operating room of a medical facility and constructed in accordance with the principles of the present invention. In the illustrated embodiment, the interrogation system is employed within the operating room having an operating table 202 with a patient 203 thereon and a back table 204 that accommodates a plurality of surgical instruments 205a and disposable items 205b (such as sponges). Other equipment, such as Mayo stands, ring stands, additional back tables and a kick-bucket are also well known to those familiar with the operating room environment and will also likely be present in some quantity and arrangement. The interrogation system includes a computer system 210, an operating room transceiver 215 that transmits and receives signals associated with the computer system 210 and an interrogator (e.g., a portable interrogator) 225. It should be understood that the interrogator may be affixed to a table (e.g., the back table 204), stand, wall or ceiling within a facility and may also be embodied in multiple coordinated systems and subsystems, both hardware and software.

The computer system 210 may operate as a client that is coupled to a server associated with the medical facility or, alternatively, the computer system 210 may be a stand-alone unit solely dedicated to the operating room 201. The transceiver 215 is coupled between the computer system 210 and the portable interrogator 225 and is employed to transmit signals to and receive signals from the portable interrogator 225.

In the illustrated embodiment, the transceiver 215 includes transmit and receive sections that are coupled through a wired connection 217 to an antenna array having first, second, third and fourth antenna elements 216a, 216b, 216c, 216d located proximate the corners of the operating room 201. The antenna array may be employed by the transceiver 215 to wirelessly communicate with the portable interrogator 225 through an interrogator antenna 226 included in the portable interrogator 225. The interrogator antenna 226 may be external as shown, or alternatively, it may be integrated into the body of the portable interrogator 225. Of course, other antenna configurations including additional or fewer antenna elements or alternate placements may be employed as directed by specific parameters or characteristics associated with an operating room environment. Also, a charging stand 230 which charges the portable interrogator 225, provides a secure place for the portable interrogator 225 to stay when not in use, charges the batteries of the portable interrogator 225, and can provide an interface between the portable interrogator 225 and the computer system 210.

The portable interrogator 225 includes a metal sensing subsystem that provides a first signal having a metal signature representing a presence of a metal object and a radio frequency identification (RFID) sensing subsystem that provides a second signal having an RFID signature representing a presence of an RFID object. In the illustrated embodiment, the metal sensing subsystem is configured to employ a metal sensing interface and a metal sensing antenna. Similarly, the RFID sensing subsystem is configured to employ an RFID sensing antenna interface and an RFID sensing antenna. In an alternative embodiment, the metal and RFID sensing subsystems are configured to employ an antenna diplexer and an integrated sensing antenna. Alternatively, the metal and RFID sensing subsystems may be integrated into a sensing subsystem that provides a signal or a plurality of signals having at least one of a metal signature representing a presence of a metal object and an RFID signature representing a presence of an RFID object.

The portable interrogator 225 also includes a control and processing subsystem (also referred to as a control and processing system) that discerns a presence of at least one of the metal and RFID objects from one of the first and second signals. The control and processing subsystem may also coordinate a processing of the signal(s) from the sensing subsystem to discern a presence of at least one of said metal and RFID objects. The control and processing subsystem may also employ an adaptive integrating filter and coordinate a processing of the signal(s) in conjunction with one of an observable and data to discern a presence of at least one of the metal and RFID objects. The portable interrogator 225 also includes a communications subsystem, coupled to the interrogator antenna 226, that allows communication with the transceiver 215. The portable interrogator 225 further includes an internal user interface 227 and an external user interface 228 that is coupled to the computer system 210, in the illustrated embodiment. The portable interrogator 225 still further includes a position sensor that allows a position of the portable interrogator 225 to be determined. The portable interrogator 225 may also have a wired interface, for example, a Universal Serial Bus (USB) port.

Prior to starting a surgical procedure, the portable interrogator 225 may be employed to inventory the plurality of surgical instruments 205a and disposable items 205b in the operating room 201. This may be accomplished by scanning the plurality of surgical instruments 205a and disposable items 205b with the portable interrogator 225, before surgery begins. Alternatively, a separate asset management system may provide this information to the portable interrogator 225. Verification of the inventory may employ both approaches. In addition, the presence of a particular kind of surgical instrument 205a may be verified through the scanning action as was requested by a medical professional. The request may have been arranged through the computer system 210 or through a medical professional's PDA. During the surgical procedure, the portable interrogator 225 may be employed to monitor any movement or repositioning of the plurality of surgical instruments 205a and disposable items 205b thereby providing location tracking during use of any of the items in the surgical procedure.

Additionally, the portable interrogator 225 may be employed to scan the patient 203 before, during or after closing the surgical procedure. Scanning the patient 203 before the surgical procedure provides location of metal or RFID objects already present in the patient 203. Scanning the patient 203 during the surgical procedure provides a real-time, operational assurance that the location of the plurality of surgical instruments 205a and disposable items 205b are where they are intended to be. Scanning the patient 203 after concluding the surgical procedure provides a verification that any metal or RFID objects remaining are only those intended. In addition, the portable interrogator 225 may make multiple scans about the patient 203 to further assist in ascertaining a location of any metal or RFID objects.

The portable interrogator 225 may be employed in either an autonomous or an integrated mode of operation. In the autonomous mode of operation, the control and processing subsystem autonomously accomplishes the operation of the portable interrogator 225, provides all analysis algorithms and performs all functions needed to discern the presence of metal and RFID objects that have been scanned by the portable interrogator 225. Alternatively, the integrated mode of operation employs the computer system 210, either wirelessly via the transceiver 215, the antenna array and the interrogator antenna 226 or through the wired interface, to support the control and processing subsystem in discerning the presence of metal and RFID objects. The integrated mode may provide for a greater selection of sensors and sensed items that may be integrated into an enhanced solution. The integrated mode typically allows a more extensive utilization of databases and algorithms to be employed than in the autonomous mode of operation.

The majority of moveable metal objects employed in the operating room 201 are typically surgical instruments or sharps of various sizes and shapes or metal structures intended to be surgically implanted in the patient 203. Other metal objects may include disposable sponges employing a metal wire that allows their detection by the metal sensing subsystem. Each of the metal objects generates a metal signature that allows its detection by the portable interrogator 225. Generally, the metal signature may cause its associated first signal to possess a universal characteristic, such as a shape, an amplitude or a frequency spectrum, that indicates metal is present. More specifically, the metal signature may cause the first signal to possess a particular characteristic that is substantially unique to a particular type of metal object thereby allowing a more unique identification.

RFID signatures differ from metal signatures in that the RFID signature, associated with the second signal, is unique and independent of a shape or a size of the RFID object. The RFID signature is normally provided by an RFID tag (e.g., an RFID information tag including data thereon, of which one is designated 207) applied to the object. For the purposes of discussion herein, a metal object refers to an object including metal and an RFID object refers to an object with an RFID tag or some other radio frequency identification associated therewith. If an RFID tag were applied to a surgical metal instrument, for example, the portable interrogator 225 would recognize a unique RFID signature as well as the metal signature that may be general or specific to the surgical metal instrument. The metal signature may be used to discern that an object is a metal object, or that it is a type of surgical metal instrument. However, the RFID signature may be used to discern exactly which surgical metal instrument the metal object is. Additionally, RFID tagging of disposable items, such as sponges, may provide a unique RFID signature for each item, whereas disposable items incorporating only a metal wire may typically provide a metal signature specific to all such items.

The internal user interface 227 typically includes an integral display employing alphanumeric or graphical characters and a touchpad for entering data or information. The internal user interface 227 may also employ audible or visual alarms. In the illustrated embodiment, the external user interface 228 includes a monitor 228a and a keyboard 228b that are wirelessly coupled to the portable interrogator 225 and the computer system 210. Alternatively, the wired interface of the portable interrogator 225 may be employed to couple the external user interface 228 to the portable interrogator 225. The external user interface 228 may provide a more extensive data entry capability while facilitating a broader monitoring capability than may be provided by the internal user interface 227.

Position monitoring of the portable interrogator 225 is provided by the position sensor, which allows a relative determination of its position with respect to the patient 203, the back table 204 or another location. RFID position markers may be placed on the patient 203 at predetermined benchmark positions, such as the nose, navel, knee and ankle, to provide substantially unique patient dimensions (or a location of a feature of a patient) and allow other patient attribute positions and metrics to be more accurately determined. Additionally, RFID/metal calibration markers may be positioned at other locations on the patient 203 to allow the portable interrogator 225 to calibrate depths or other appropriate thicknesses associated with the patient 203. Of course, RFID markers may be placed on items such as the back table, ring stand, the Mayo stand or any other location within the operating room deemed appropriate.

A plurality of the portable interrogators 225 may be coupled together mechanically or electrically, either wirelessly or through their wired interfaces, to form a networked-interrogator mode of operation. The networked-interrogator mode of operation allows two or more interrogators to share and collaborate data. This collaboration may include the coordination of a plurality of interrogators simultaneously employed on the patient 203. Alternatively, the collaboration may also include coordinating information associated with the operating room 201, such as information associated with items on the back table 204, as well as other pertinent information located within the medical facility environment. This collaborative effort may occur in real time or over a period of time and may employ the interrogators operating in an autonomous mode, an integrated mode or a combination of the modes.

Figure 3:
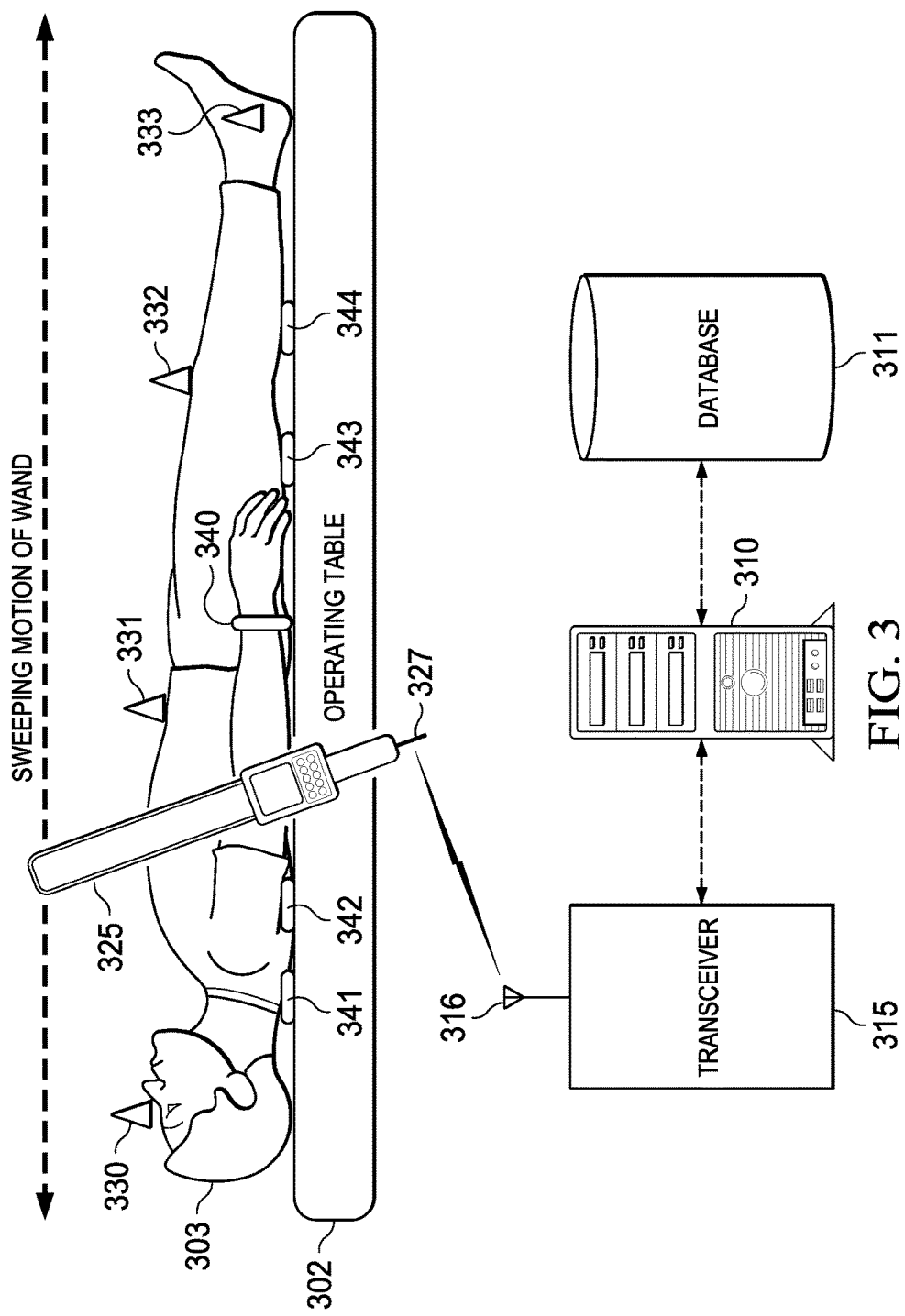
FIG. 3 illustrates a pictorial diagram of an embodiment of an interrogation system employable within an operating room of a medical facility and constructed in accordance with the principles of the present invention.

Turning now to FIG. 3, illustrated is a pictorial diagram of an embodiment of an interrogation system employable within an operating room of a medical facility and constructed in accordance with the principles of the present invention. In the illustrated embodiment, the interrogation system is employed within an operating room having an operating table 302 with a patient 303. Those skilled in the art should understand, however, that the principles of the present invention are equally applicable to other industries and fields of operation.

The interrogation system includes a computer system 310 coupled to a database 311, a transceiver 315 that transmits and receives signals associated with the computer system 310 employing a transceiver antenna 316 and an interrogator (e.g., a portable interrogator) 325 employing an interrogator antenna 327. The interrogation system also includes first, second, third and fourth RFID position markers 330, 331, 332, 333, (collectively referred to as RFID position markers 330-333), an RFID patient bracelet 340 attached to the patient 303 and first, second, third and fourth RFID/metal calibration markers 341, 342, 343, 344, (collectively referred to as RFID/metal calibration markers 341-344).

The RFID position markers 330-333 may be placed at predetermined locations on the patient 303. Generally, RFID position markers provide "position-unique" mapping of the patient 303 wherein the mapping may employ more or less RFID position markers than those shown therein. When used in conjunction with a sweeping motion of the portable interrogator 325, it may be possible to specifically identify the presence of a metal or an RFID tagged object as being located between two of the RFID position markers. Thus, a control and processing subsystem of the portable interrogator may employ multiscan, coherent signal processing to coordinate a processing of a plurality of signals (e.g., resulting from multiple scans) from a sensing subsystem to discern a presence of at least one of metal and RFID objects.

Additionally, employing an inertial position sensor in the portable interrogator 325 allows a more precise determination of the presence and location of an RFID or metal object between these two RFID position markers. In this instance, it may be possible to integrate sensor data across multiple sweeps of the portable interrogator 325 thereby increasing its sensitivity and quality of detection. Of course, any number of RFID position markers may be employed and positioned as appropriate to a particular situation.

The RFID/metal calibration markers 341-344 have unique RFID signatures and known amounts and types of metal. They are typically not placed on top of the patient 303, but are placed beneath or on the side of the patient 303, such as the underside of a leg or between an arm and the chest. As the portable interrogator 325 is swept over the patient 303, the RFID/metal calibration markers 341-344 are used to calibrate the type and sensitivity of interrogation needed by the portable interrogator 325 to provide an acceptable level of object identification thereby achieving an increased integrity of operation. Of course, any number of RFID/metal calibration markers may be employed and positioned as appropriate to a particular situation. Alternatively, calibration markers may be employed that use only RFID or only metal as appropriate to a particular application.

The RFID patient bracelet 340 contains specific information pertaining to the patient 303. The RFID patient bracelet 340 is read, either by the portable interrogator 325 or another appropriate device. The specific information may then be applied by the portable interrogator 325 or the computer system 310 for the purpose of further improving measurement sensitivity and quality. For example, ample interrogation for a seven year old female patient weighing 40 pounds may be quite different from that of a 50 year old male patient weighing 260 pounds. Identifying the patient 303 as well as employing specific databases and general information associated with the patient 303 allows for measurement quality and sensitivity improvements. The computer system 310 employing the database 311 may be employed in an integrated mode of operation or the portable interrogator 325 may operate autonomously.

Additionally, the interrogation system may include and cooperate with a medical facility server and extended databases to provide additional information and algorithms to be used as part of the interrogating process. Not only is patient-specific information available, but statistical information, relevant to patient types may also be available. This information may be employed for extensive signal processing within the medical facility server, or subsets of this information may be used for signal processing within the computer system 310 or the portable interrogator 325 itself.

Figure 4:
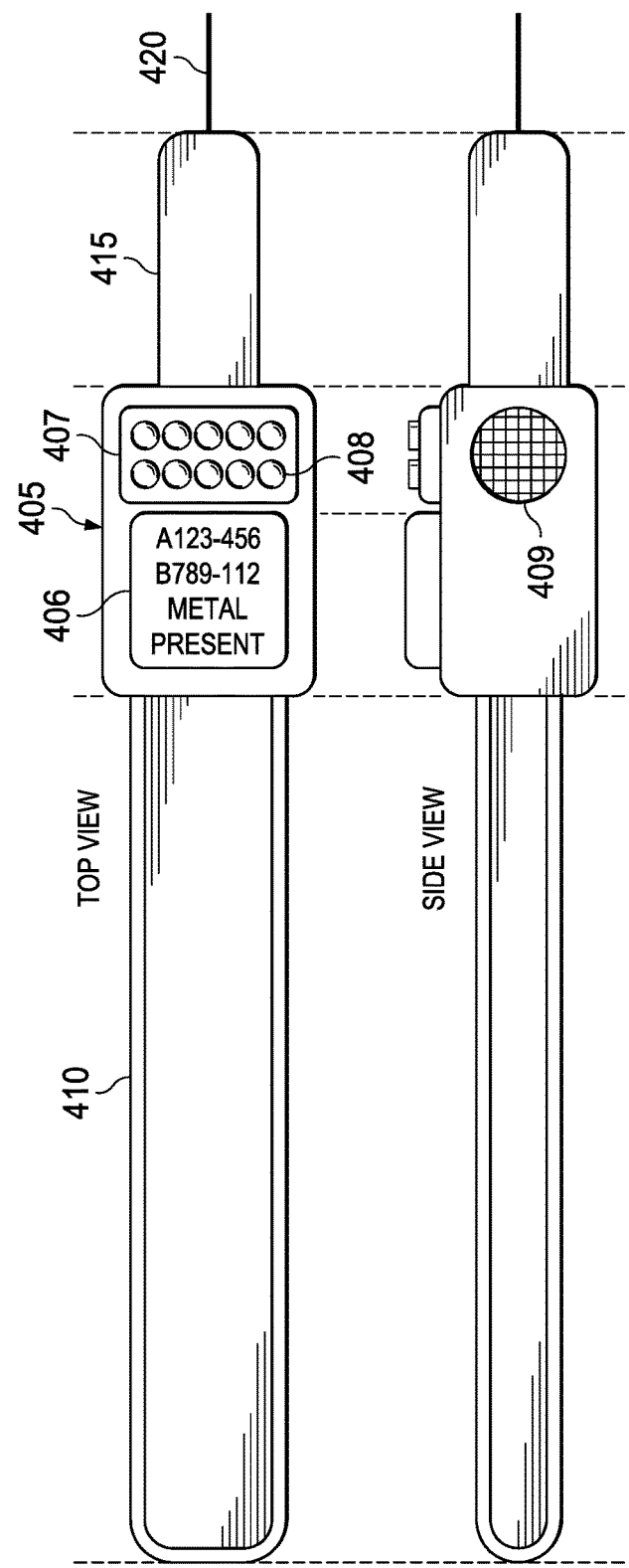
FIG. 4 illustrates a pictorial diagram of an embodiment of an interrogator constructed in accordance with the principles of the present invention.

Turning now to FIG. 4, illustrated is a pictorial diagram of an embodiment of an interrogator (e.g., a portable interrogator) constructed in accordance with the principles of the present invention. The portable interrogator includes an electronics housing 405 having a display 406, a touch pad 407 employing a collection of touch keys 408 and an audible alarm 409. The portable interrogator also includes a sensing antenna assembly 410, a handle 415 and an interrogator antenna 420.

The sensing antenna assembly 410 contains RFID and metal sensing antennas and antenna interfaces that may be employed to sense RFID and metal objects associated with, for instance, a patient in a medical environment. The electronics housing 405 contains a metal sensing subsystem, an RFID sensing subsystem, a control and processing subsystem and a communications subsystem. The metal sensing subsystem and the RFID sensing subsystem accept RFID and metal antenna signals, respectively, and are coupled to the control and processing subsystem for signal processing that results in the detection of RFID and metal objects, when present. Again, the metal and RFID sensing subsystems may be integrated into a sensing subsystem. The control and processing subsystem is coupled to the communications subsystem, which employs the interrogator antenna 420 to communicate with external computer systems, databases and displays. The display 406, the touch pad 407 and the audible alarm 409 provide an integral user interface for the portable interrogator. Also, while the interrogators have been described in relation to a medical environment, one skilled in the art should understand that the interrogator may be employed in other environments and still be within the broad scope of the present invention. Also, for further information about applications for the interrogation system especially in the medical environment, see U.S. patent application Ser. No. 10/378,043, entitled "An Interrogator and Interrogation System Employing the Same," filed on Mar. 3, 2003, to Volpi, et al., which is incorporated herein by reference.

Figure 5:
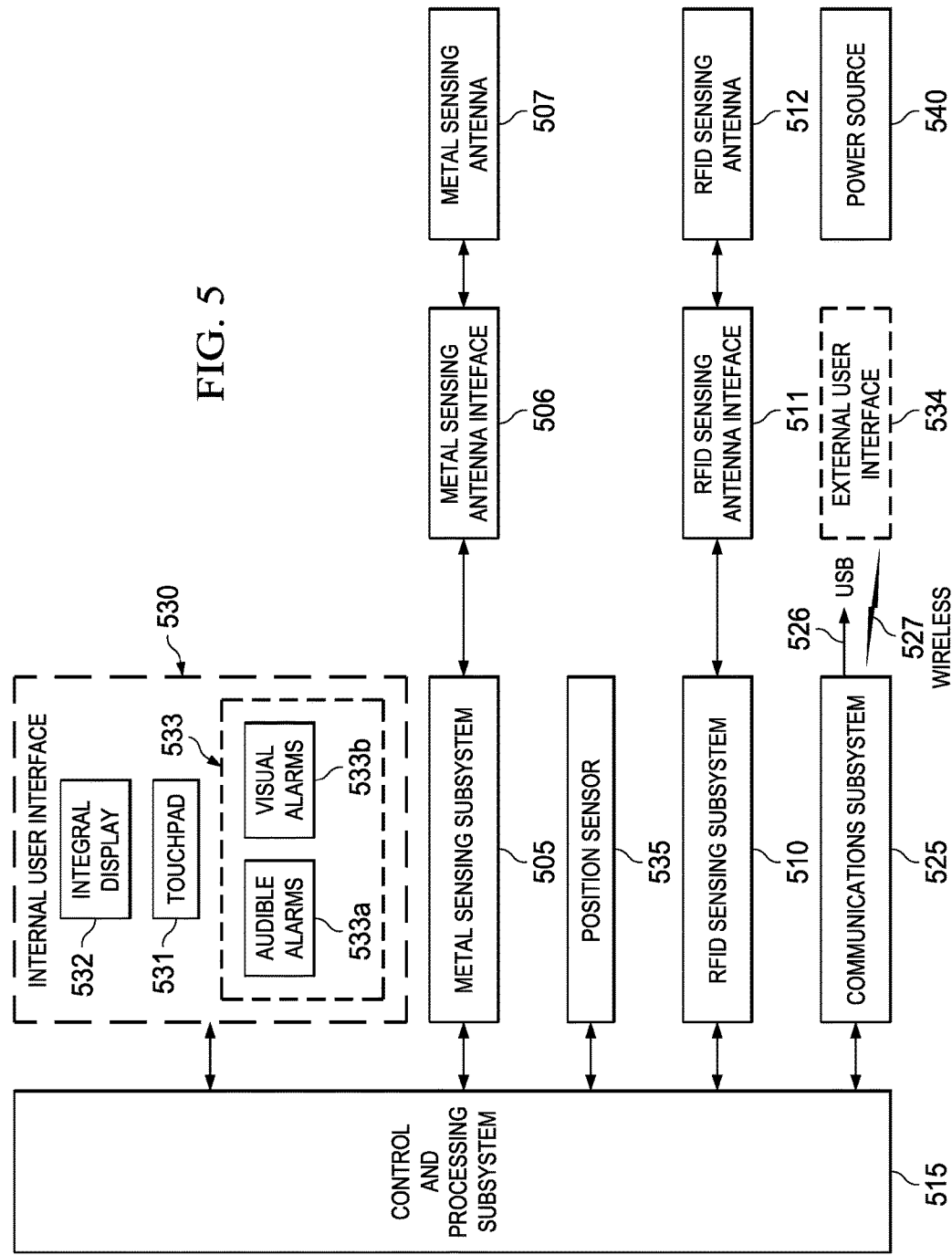
FIG. 5 illustrates a system diagram of an embodiment of an interrogator constructed in accordance with the principles of the present invention.

Turning now to FIG. 5, illustrated is a system diagram of an embodiment of an interrogator constructed in accordance with the principles of the present invention. The interrogator includes a metal sensing subsystem 505, a metal sensing antenna interface 506, a metal sensing antenna 507, an RFID sensing subsystem 510, an RFID sensing antenna interface 511, an RFID sensing antenna 512, a control and processing subsystem 515, a communications subsystem 525, an internal user interface 530, a position sensor 535 and a power source 540. While the illustrated embodiment provides for an integrated metal and RFID detection capability, those skilled in the art should understand that portions of the interrogator may be omitted or rendered inactive to provide a metal or RFID interrogator.

In the illustrated embodiment, the internal user interface 530 includes a touchpad 531, an integral display 532 and an alarm 533, which may include both an audible alert 533a and a visual alert 533b. Additionally, the interrogator employs an external user interface 534 (e.g., including a charging stand or cradle), coupled through the communications subsystem 525 via a USB connection 526 or a wireless connection 527, for example, as shown. The external user interface 534 may employ substantially similar elements as the internal user interface 530. However, the display and touchpad elements may be larger and more extensive in capability.

The metal sensing subsystem 505 is coupled to the metal sensing antenna interface 506 and the metal sensing antenna 507 and is configured to provide a first signal having a signature representing a presence of a metal object. The RFID sensing subsystem 510 is coupled to the RFID sensing antenna interface 511 and the RFID sensing antenna 512 and is configured to provide a second signal having a signature representing a presence of an RFID object. The control and processing subsystem 515 is coupled to the metal sensing subsystem 505 and the RFID sensing subsystem 510 and is configured to discern a presence of at least one of the metal and RFID objects from one of the first and second signals.

The control and processing subsystem 515 coordinates an operation of the metal sensing subsystem 505 and the RFID sensing subsystem 510. Additionally, the control and processing subsystem 515 analyzes the first signal for a metal object signature and the second signal for an RFID object signature. The metal object signature typically may be created by a change or distortion in a field associated with the metal sensing subsystem 505. The RFID object signature typically may be created as an identification data sequence associated with an RFID object. Analysis of the first and second signals may employ signature parameters based on factors such as a size, a shape, an orientation, likelihood, a position or a depth associated with the metal object or the RFID object. Additionally, the analysis may employ data associated with metal and RFID objects that is internally or externally stored.

The control and processing subsystem 515 is also coupled to the communications subsystem 525, the internal user interface 530 and the position sensor 535. The position sensor 535 may typically be of an inertial type and may provide either two dimensional (2D) or three dimensional (3D) information as to the position of the interrogator for the purpose of aiding metal or RFID tag detection. In the illustrated embodiment, the communications subsystem 525 employs transmit and receive circuitry coupled to an antenna to exchange data with an external transceiver.

For example, the communications subsystem 525 may be employed to send metal and RFID signature information to an external server for a more extensive analysis that may be beyond the capability of the control and processing subsystem 515. The results of the analysis may be returned through the communications subsystem 525 for final disposition by the control and processing subsystem 515. Alternatively, the control and processing subsystem 515 may employ the communications subsystem 525 to sequentially query external databases for signature profiles or analysis algorithms to be applied locally by the control and processing subsystem 515.

The internal user interface 530 allows a user to interact with the interrogator to provide input and receive output associated with its application. The position sensor 535 cooperates with the control and processing subsystem 515 to allow a position of the interrogator to be determined. The power source 540 employs a rechargeable or replaceable battery and provides necessary operating supply voltages to the interrogator.

The user of the interrogator may employ the touchpad 531 to select a mode of operation or both enter and request information about a specific metal or RFID object. The integral display 532 may be employed to show an RFID number or indicate that the interrogator is detecting the presence of a metal or RFID object. Alternatively, the external display 534 may be employed to indicate the presence of a metal or RFID object. Additionally, the integral display 532 or the external display 534 may be employed in conjunction with the position sensor 535 to determine a profile and a position of the metal or RFID object with respect to a movement or sweeping motion of the interrogator. The audible alert 533*a* may include distinctive tones or synthesized voice communications. The visual alert 533*b* may be flashing or colored features that include textual or graphical representations. The visual alert 533*b* may be associated with the integral display 532, the external display 534, or they may be stand-alone.

Figure 6:
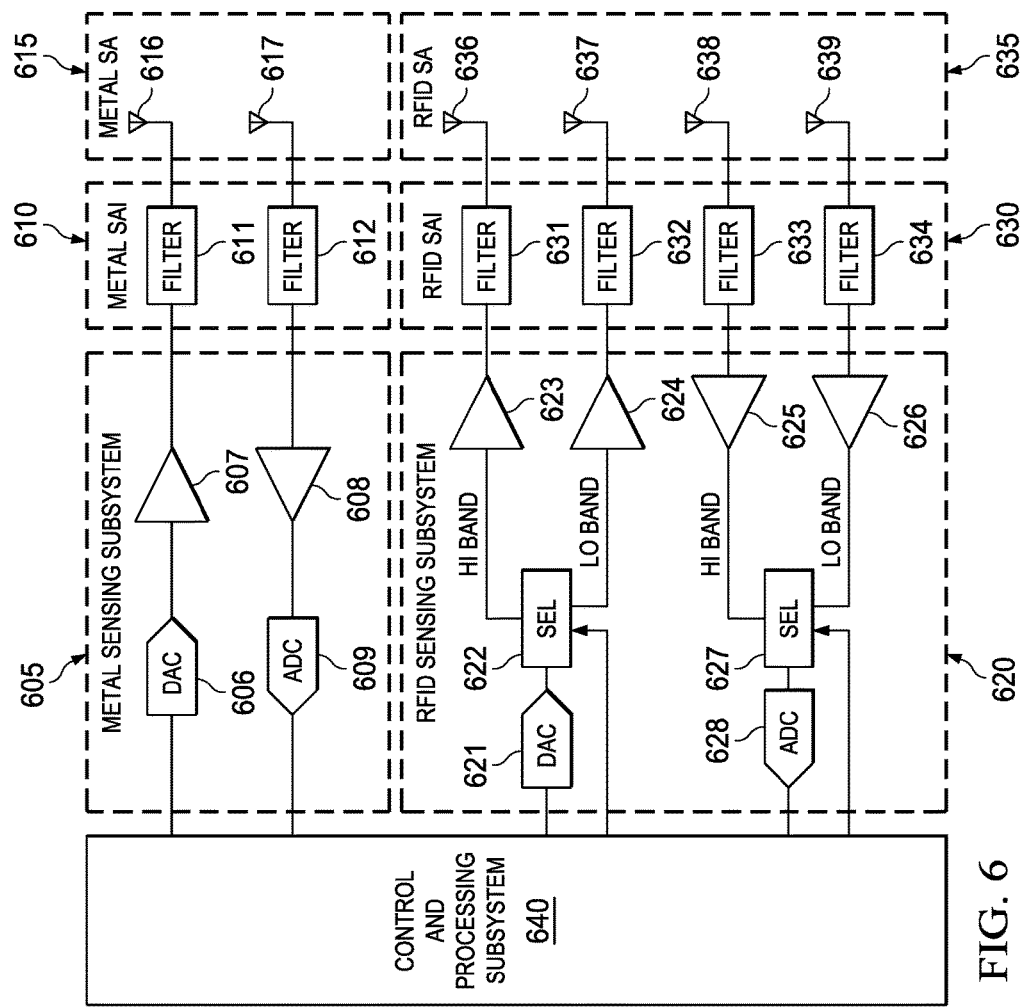
FIG. 6 illustrates a block diagram of another embodiment of an interrogator constructed in accordance with the principles of the present invention.

Turning now to FIG. 6, illustrated is a block diagram of another embodiment of an interrogator constructed in accordance with the principles of the present invention. The interrogator includes a metal sensing subsystem 605, a metal sensing antenna interface 610, a metal sensing antenna 615, an RFID sensing subsystem 620, an RFID sensing antenna interface 630, an RFID sensing antenna 635 and a control and processing subsystem 640. While the illustrated embodiment provides for an integrated metal and RFID detection capability, those skilled in the art should understand that portions of the interrogator may be omitted or rendered inactive to provide a metal or RFID interrogator.

The metal sensing subsystem 605 includes a metal sensing digital-to-analog converter (DAC) 606, a metal sensing transmit amplifier 607, a metal sensing receive amplifier 608 and a metal sensing analog-to-digital converter (ADC) 609. The metal sensing antenna interface 610 includes a metal sensing transmit conditioning filter 611 and a metal sensing receive conditioning filter 612. The metal sensing antenna 615 includes a metal sensing transmit antenna 616 and a metal sensing receive antenna 617.

The RFID sensing subsystem 620 includes an RFID sensing DAC 621, an RFID sensing transmit selector switch 622, a first RFID sensing transmit amplifier 623, a second RFID sensing transmit amplifier 624, a first RFID sensing receive amplifier 625, a second RFID sensing receive amplifier 626, an RFID sensing receive selector switch 627 and an RFID sensing ADC 628. The RFID sensing antenna interface 630 includes first and second RFID sensing transmit conditioning filters 631, 632 and first and second RFID sensing receive conditioning filters 633, 634. The RFID sensing antenna 635 includes first and second RFID sensing transmit antennas 636, 637 and first and second RFID sensing receive antennas 638, 639. "HI band" and "LO band" capabilities are present to accommodate the wide frequency range necessary to detect the various types of RFID tags.

In an alternative embodiment, a mixing or heterodyning function may be included within the RFID sensing ADC 628 or the RFID sensing DAC 621 functions. These techniques are known to those skilled in the pertinent art and may be employed to translate signal processing to a more desirable frequency range thereby allowing less expensive or more readily available components to be used. Additionally, the specific nature and function of the first and second transmit conditioning filters 631, 632 and first and second RFID sensing receive conditioning filters 633, 634 may vary depending on the specific algorithms employed for control and processing and for signal generation and recovery. Also, some embodiments may not require some or all of the filters shown.

In the illustrated embodiment, the control and processing subsystem 640 may be a software defined structure that allows features and functions of the interrogator to be easily modified or tailored by altering software functions. The control and processing subsystem 640 employs a crystal oscillator to provide a precise frequency reference for both the metal and RFID sensing subsystems 605, 620.

The control and processing subsystem 640 generates a metal sensing digital excitation signal based on a metal sensing mode of operation selected and provides this signal to the metal sensing DAC 606. The metal sensing digital excitation signal may be in the form of a continuous tone. Alternatively, the digital excitation signal may vary in amplitude, frequency, or phase and may also be of a pulsed nature wherein the waveform duty cycle is less than 100 percent. The frequency of the metal sensing digital excitation signal may generally be in the range of five to 100 kHz. Different waveforms may be used to optimize a detection of both ferrous and non-ferrous metals. These waveforms may be selected for different sizes and masses of metals and for metals at different locations and depths within a patient. Algorithmic information employed in generating these excitation signals may be part of the control and processing subsystem 640.

The metal sensing DAC 606 converts the metal sensing digital excitation signal into an analog signal that, except for its amplitude, is the metal sensing transmit signal. The analog signal is provided to the metal sensing transmit amplifier 607, which amplifies the analog signal to a correct amplitude for transmission. The output of the metal sensing transmit amplifier 607 is provided to the metal sensing transmit conditioning filter 611, which sufficiently attenuates all out-of-band signals and provides a proper impedance match to the metal sensing transmit antenna 616. The metal sensing transmit antenna 616 launches the metal sensing transmit signal.

A metal object present in the vicinity of the metal sensing transmit antenna 616 and the metal sensing transmit signal will generate a metal sensing return signal wherein the metal sensing return signal may be based on a change in a field characteristic of the metal sensing transmit signal. The field characteristic may be altered in the vicinity of the metal object such that a distinctive metal sensing receive signal impinges on and excites the metal sensing receive antenna 617. The output of the metal sensing receive antenna 617 is provided to the metal sensing receive conditioning filter 612, which sufficiently attenuates all out-of-band energy and provides a proper impedance match between the metal sensing receive antenna 617 and the metal sensing receive amplifier 608.

The metal sensing receive amplifier 608 amplifies the metal sensing receive signal to a level sufficient for processing and provides it to the metal sensing ADC 609. The metal sensing ADC 609 provides a metal sensing digital signal, proportional to the metal sensing receive signal, to the control and processing subsystem 640, which determines if the metal sensing digital signal has a signature representing a presence of a metal object in the vicinity of the metal sensing antenna 615.

The control and processing subsystem 640 generates an RFID sensing digital excitation signal based on an RFID mode of operation selected and outputs this signal to the RFID sensing DAC 621. The RFID sensing digital excitation signal may be in the form of a code that excites and energizes an RFID object present including an RFID tag. The carrier frequency associated with this code may be in one of two frequency bands. A first frequency band may be centered around 133-135 kHz and is designated as the "LO band." A second frequency band may be centered around 10-13 MHz and is designated the "HI band." Alternatively, a "HI band" around 902-928 MHz may also be employed. Alternatively, the 133-135 kHz and the 10-13 MHz bands may be combined in the "LO band" and some specific implementations may require only a single band. A frequency band is selected based on the RFID mode of operation selected. Each frequency band corresponds to different types of RFID tags present, which may be based on its size or other factors. Generally, algorithmic information to generate the RFID sensing digital excitation signal is contained in the control and processing subsystem 640.

The RFID sensing DAC 621 converts the RFID sensing digital excitation signal into an analog signal that, except for amplitude, is the RFID sensing transmit signal. The RFID sensing transmit signal is provided to the RFID sensing transmit selector switch 622, which is controlled by the control and processing subsystem 640. The RFID sensing transmit selector switch 622 directs the RFID sensing transmit signal to the first RFID sensing transmit amplifier 623 or the second RFID sensing transmit amplifier 624, respectively, based on whether the RFID sensing transmit signal is "HI band" or "LO band." The first RFID sensing transmit amplifier 623 and the second RFID sensing transmit amplifier 624 increase the amplitude of the "HI band" and "LO band" signals to a correct amplitude for transmission.

The first RFID sensing transmit amplifier 623 provides the "HI band" signal to the first RFID sensing transmit conditioning filter 631 and the second RFID sensing transmit amplifier 624 provides the "LO band" signal to the second RFID sensing transmit conditioning filter 632. The first and second RFID sensing transmit conditioning filters 631, 632 employ differing center frequencies and sufficiently attenuate associated out-of-band signals. Additionally, they provide a proper impedance match to their respective first or second RFID sensing transmit antennas 636, 637, which launch their respective RFID sensing transmit signals.

An RFID object, including an RFID tag, in the vicinity of the first or second RFID sensing transmit antenna 636, 637 generates an RFID sensing return signal. The RFID sensing return signal impinges on and excites the appropriate first or second RFID sensing receive antenna 638, 639, respectively, to provide an RFID sensing receive signal. An output of the first or second RFID sensing receive antenna 638, 639 is provided to the first or second RFID receive conditioning filter 633, 634, respectively. The first or second RFID receive conditioning filter 633, 634 sufficiently attenuates the out-of-band energy and provides a proper impedance match between the first or second RFID sensing receive antenna 638, 639 and the first or second RFID sensing receive amplifier 625, 626, respectively.

The first or second RFID sensing receive amplifier 625, 626 amplifies the small RFID sensing receive signal to a level sufficient for processing and provides an amplified RFID sensing receive signal to the RFID sensing receive selector switch 627, which is controlled by the control and processing subsystem 640. The control and processing subsystem 640 selects the appropriate reception path through the RFID sensing receive selector switch 627 for input to the RFID sensing ADC 628, based on the excitation signal transmitted. The RFID sensing ADC 628 provides an RFID sensing digital signal, proportional to the RFID sensing receive signal, to the control and processing subsystem 640, which determines if the RFID sensing receive signal has a signature representing a presence of an RFID object in the vicinity of the RFID sensing antenna 635.

Figure 7:
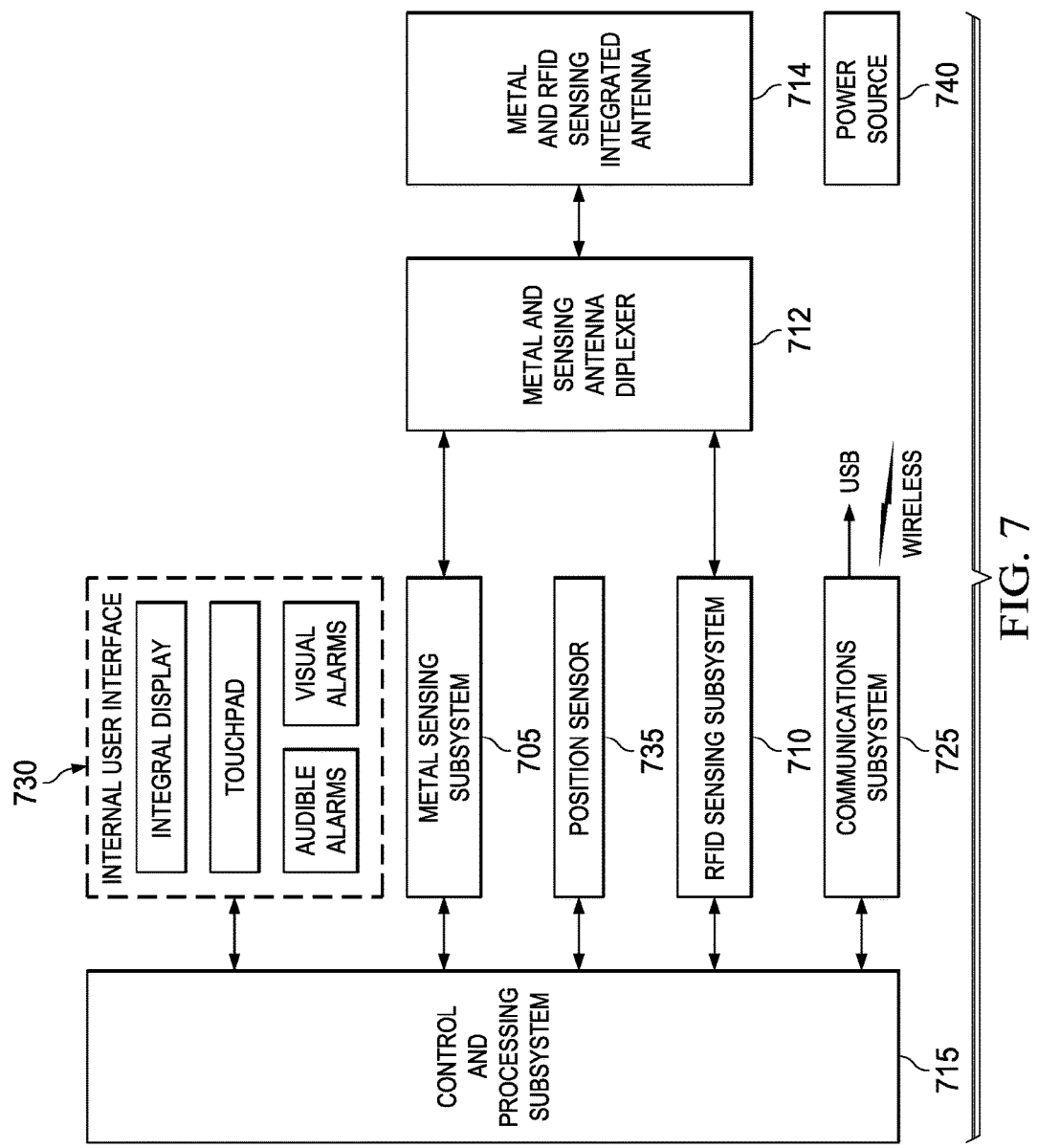
FIG. 7 illustrates a system diagram of an alternative embodiment of an interrogator constructed in accordance with the principles of the present invention.

Turning now to FIG. 7, illustrated is a system diagram of an alternative embodiment of an interrogator constructed in accordance with the principles of the present invention. The interrogator includes a metal sensing subsystem 705, an RFID sensing subsystem 710, a metal and RFID sensing antenna diplexer 712, a metal and RFID sensing integrated antenna 714, a control and processing subsystem 715, a communications subsystem 725, a user interface 730, a position sensor 735 and a power source 740.

The interrogator is similar to the interrogator of FIG. 5 wherein the metal and RFID sensing antenna diplexer 712 has replaced the metal sensing antenna interface 506 and the RFID sensing antenna interface 511. Additionally, the metal and RFID sensing integrated antenna 714 has replaced the metal sensing antenna 507 and the RFID sensing antenna 512. General operation of the interrogator is also similar to the operation of the interrogator of FIG. 5.

However, the interrogator employs the metal and RFID sensing antenna diplexer 712 between the transmit and receive paths associated with both the metal sensing and RFID sensing subsystems 705, 710. The metal and RFID sensing antenna diplexer 712 accommodates the frequency selecting and impedance matching functions. Similarly, the metal and RFID sensing integrated antenna 714 is also employed in both the transmit and receive paths associated with both the metal sensing and RFID sensing subsystems 705, 710. A more detailed discussion of the metal and RFID sensing antenna diplexer 712 and the metal and RFID sensing integrated antenna 714 are presented below with respect to FIG. 8.

Figure 8:
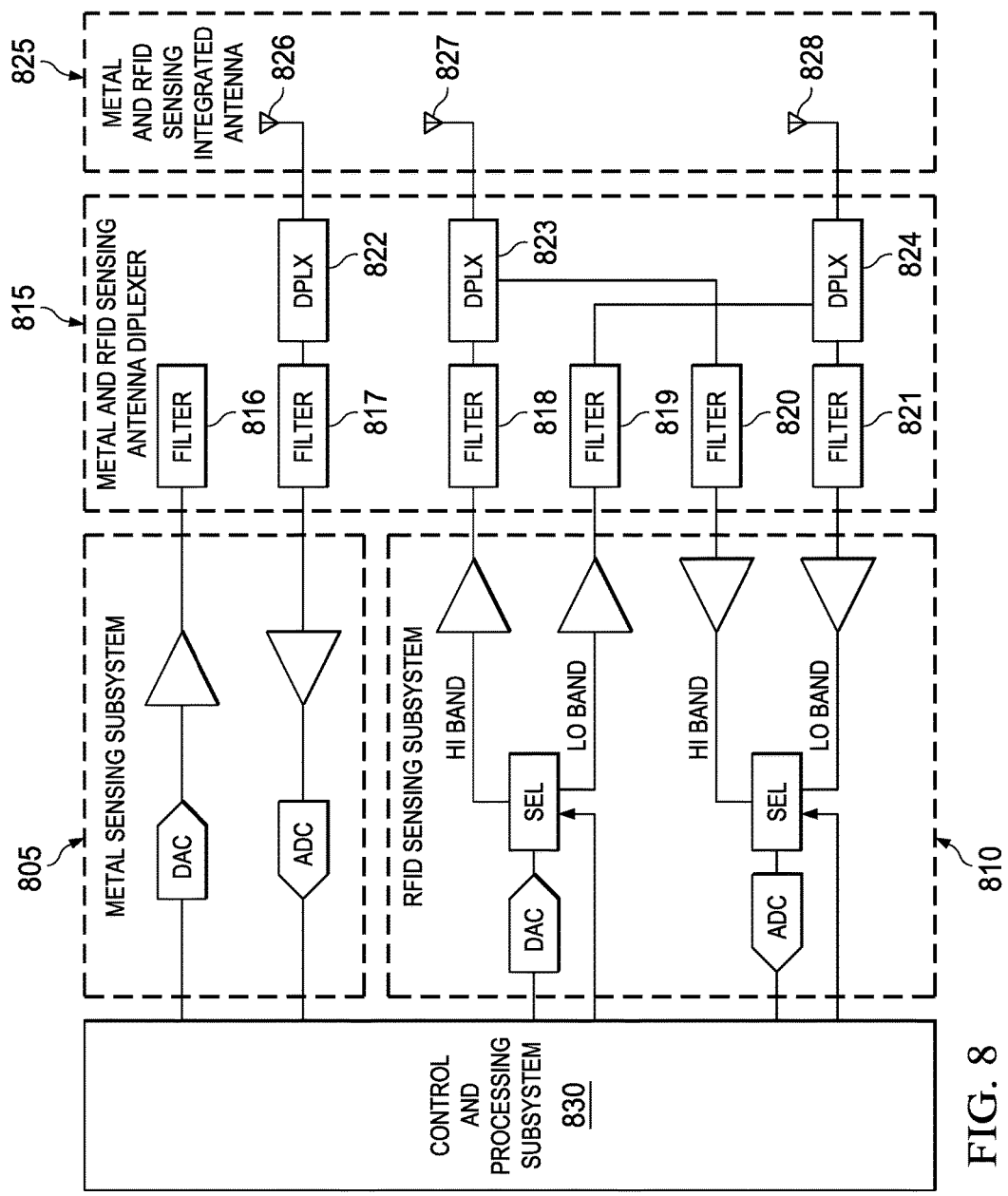
FIG. 8 illustrates a block diagram of another embodiment of an interrogator constructed in accordance with the principles of the present invention.

Turning now to FIG. 8, illustrated is a block diagram of another embodiment of an interrogator constructed in accordance with the principles of the present invention. The interrogator includes a metal sensing subsystem 805, an RFID sensing subsystem 810, a metal and RFID sensing antenna diplexer 815, a metal and RFID sensing integrated antenna 825 and a control and processing subsystem 830.

The metal and RFID sensing antenna diplexer 815 includes a metal sensing transmit conditioning filter 816, a metal sensing receive conditioning filter 817, a metal sensing diplexer switch 822, first and second RFID sensing transmit conditioning filters 818, 819, first and second RFID sensing receive conditioning filters 820, 821 and first and second RFID sensing diplexer switches 823, 824. The metal and RFID sensing integrated antenna 825 includes a metal sensing transmit/receive antenna 826 and first and second RFID sensing transmit/receive antennas 827, 828.

Operation of the metal sensing subsystem 805, the RFID sensing subsystem 810 and the control and processing subsystem 830 are analogous to the metal sensing subsystem 605, the RFID sensing subsystem 620 and the control and processing subsystem 640 as was discussed with respect to the interrogator of FIG. 6. While the RFID sensing subsystem 810 includes a single path analog-to-digital converter operating preferably at least twice the Nyquist rate, it is also well within the broad scope of the present invention to configure the analog-to-digital conversion process to operate at the Nyquist rate by separating the signal to be converted into in-phase and quadrature phase signals and performing subsequent processing thereon. Alternatively, the metal and RFID sensing subsystems 805, 810 may be integrated into a sensing subsystem that provides a signal or a plurality of signals having at least one of a metal signature representing a presence of a metal object and an RFID signature representing a presence of an RFID object.

However, the interrogator employs the metal and RFID sensing integrated antenna 825, which shares a common antenna between associated transmit and receive signals. For example, the metal sensing transmit/receive antenna 826 is coupled to both the metal sensing transmit conditioning filter 816 and the metal sensing receive conditioning filter 817 via the metal sensing diplexer switch 822. Similarly, the first and second RFID sensing transmit/receive antennas 827, 828 are coupled through the first and second RFID sensing diplexer switches 823, 824 to their corresponding RFID sensing conditioning filters.

Generally, the diplexer switches are configured as conventional three-port devices so as to provide low loss paths for excitation signals proceeding from the transmit amplifiers to the antennas and correspondingly to provide low loss paths for incoming signals from the antennas to the receiving amplifiers. In time domain configurations, these may be accomplished by simple switching or gating. In continuous mode configurations, this may be accomplished by properly phasing signals so that they are in-phase when traveling to a desired port and out-of-phase when traveling to an undesired port.

The metal and RFID sensing integrated antenna 825 provides a suitable match to both launch a transmit signal and accept a receive signal associated with the metal and RFID sensing functions. The individual antennas may consist of single elements or may themselves be complex in nature with multiple elements. The antennas may be partially shielded so as to inhibit transmitted and received radiation to and from unwanted directions. For example, an antenna being passed over a patient or portion of the operating room such as a back table or MAYO stand, should ideally have maximum sensitivity in the direction and vicinity of the patient and maximum attenuation in all other directions.

Figure 9:
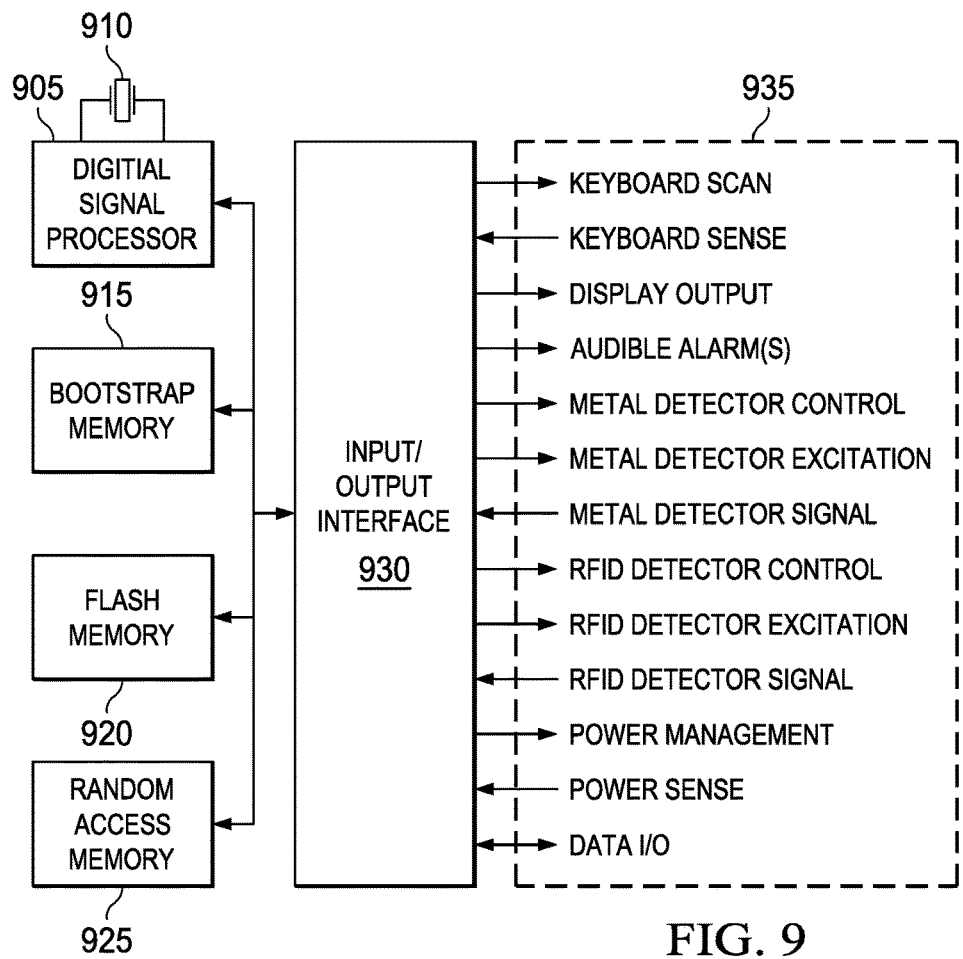
FIG. 9 illustrates a block diagram of an embodiment of a control and processing subsystem constructed in accordance with the principles of the present invention.

Turning now to FIG. 9, illustrated is a block diagram of an embodiment of a control and processing subsystem constructed in accordance with the principles of the present invention. The control and processing subsystem includes a digital signal processor 905 employing a frequency control crystal 910, a bootstrap memory 915, a flash memory 920, a random access memory 925, and an input/output interface 930.

The control and processing subsystem provides the digital signal processing functions, the signal generating functions, the control functions and the input and output interface functions associated with an interrogator. The digital signal processor 905 may be embodied as a single integrated circuit, or as a group of integrated circuits performing this role. Additionally, those skilled in the art should understand that the digital signal processor 905 may be embodied in a digital signal processor engine, combinatorial logic and software, or a digital signal processor engine, an application specific integrated circuit, glue logic (including level shifters, translators, drivers, synchronizers, etc.) and software, or a special purpose digital signal processor engine, general purpose engine and software. The transmit signals are generated within the digital signal processor 905 which also includes a signal synthesizing function. The frequency control crystal 910 provides proper timing for the signal synthesizing function.

The bootstrap memory 915 is a non-volatile read-only memory that contains a basic software program to enable the interrogator to power up, accept commands from the keyboard, display diagnostics, and allow data ports to be used. In the case of a software-related system failure, the bootstrap system 915 allows the interrogator to recover (i.e., reboot). It also possesses basic system diagnostics which may be run independently of whatever software has been loaded.

The flash memory 920 is a non-volatile random access memory, where the current operating system and program of the interrogator is loaded. The contents of the flash memory 920 may be changed, updated and checked by diagnostics and programs contained in the bootstrap memory 915. For example, diagnostics exist within the bootstrap memory 915 to test the random access memory 925. The input/output interface 930 is a portion of the control and processing subsystem that accesses all other necessary portions as well as external ports of the interrogator, wherein the collection of interface connections 935 may be considered typical.

The data I/O port of the collection of interface connections 935 allows specific software releases or upgrades to be loaded into an interrogator, either wirelessly or using a wireline. In this manner, the characteristics of the interrogator may be easily changed or upgraded as necessary or appropriate. The software defined architecture enables this capability since all signal processing decisions and signal generation initiation occurs within the control and processing subsystem.

Similarly, this architecture permits upgrading of existing algorithms and incorporation of new algorithms for existing RFID tag and metal detection without hardware modifications. Therefore, the interrogator may be employed as substantially a universal interrogator that is capable of adaptation to read multiple versions of RFID tags from various manufacturers, including future-developed RFID tags. Of course, this may also include metal detection improvements and additions, as well.

Although the embodiments of this invention presented have concentrated on the detection and monitoring of disposable and non-disposable medical equipment, alternative embodiments and future applications outside the medical field are envisioned. These applications include integrating the detection of multiple disparate objects within a single system and the integration of disparate observables into a single integrating filter. Also included are the real-time integration of observables with multiple databases, and the real-time offloading of portions of the signal processing from the interrogator.

Alternative embodiments may include added detection range, increased detection sensitivity in hostile environments, increased detection integrity, real-time versatility in dynamically selecting what is to be detected, and simultaneous universal detection of multiple types of RFID tags and metallic objects, often operating at disparate frequencies. These applications and embodiments may encompass, for example, inventory management, supply chain management, and security.

Having provided exemplary functionality associated with the interrogator and interrogation system according to the principles of the present invention, the radio frequency identification capabilities will hereinafter be described in greater detail. A protocol independent interrogation system (e.g., an RFID interrogation system) is described that includes at least one RF excitation source, typically embodied in a transmit function, and a corresponding RFID receive function. The transmit and receive functions may be employed in an interrogator that includes control and processing subsystems and sensing subsystems embodied in a software defined architecture wherein a significant portion of signal processing is done in the digital domain after an incoming signal plus any associated noise has been appropriately digitized. The interrogator can accurately and predictably detect and read the signals coming from an RFID object (i.e., an object including an RFID tag or radio frequency identifier) at levels that are substantially below the detection threshold of presently available readers.

The enhanced sensitivity of the interrogation system according to the principles of the present invention can be exploited in several configurations and for several different and disparate applications. The flexibility of the interrogator allows selected RFID tags to remain "quiet" and others to come alive and "talk." Additionally, an interrogator constructed according to the principles of the present invention may be configured to operate in a conventional reader mode or to employ enhanced sensitivity to perform a "deep" or "focused" detection mode to search for the RFID tags. By a "deep" or "focused" detection mode, the interrogator may be set to increase an energy of an excitation signal, command ones of the RFID tags to be "quiet," increase an integration period of a correlation subsystem of the interrogator, command a user to scan an area more diligently, or increase aid from external sensors (e.g., position sensor). The aforementioned functions may be manually set by a user or automatically performed by the interrogator.

Further with respect to the RFID sensing functionality of the interrogator, the control and processing subsystem, and RFID sensing subsystem in conjunction with an antenna transmits radio frequency excitation signals and receives a response in the form of a reply code from the RFID tag and, when necessary, down converts the responses to a lower frequency for digitization purposes. A digital-to-analog converter of the RFID sensing subsystem converts the response to a digital signal. The digitization is typically at least one bit quantization. While the amplitude information is typically not preserved for a one bit quantization, the frequency information of the response is typically preserved. As a one bit quantization is subject to squaring loss, quantization employing at least two bits may be preferable depending on the application. Higher level quantization captures amplitude information that reduces squaring loss and also obtains unique amplitude characteristics of specific RFID tags which enhances detection sensitivity.

The digitized signals are input to a digital signal processor of the control and processing subsystem. The digital signal processing may be enhanced by the use of additional external sensors, for example, an inertial position sensor that can aid detection by noting a movement of the interrogator relative to a stationary RFID tag. The control and processing subsystem determines a presence or non-presence of an RFID tag. The systems and subsystems that form the interrogator are controlled by the control and processing subsystem including system modes, detection modes, and all other relevant functions. A user interface and communications subsystem are provided for human and computer system interaction.

Figure 10:
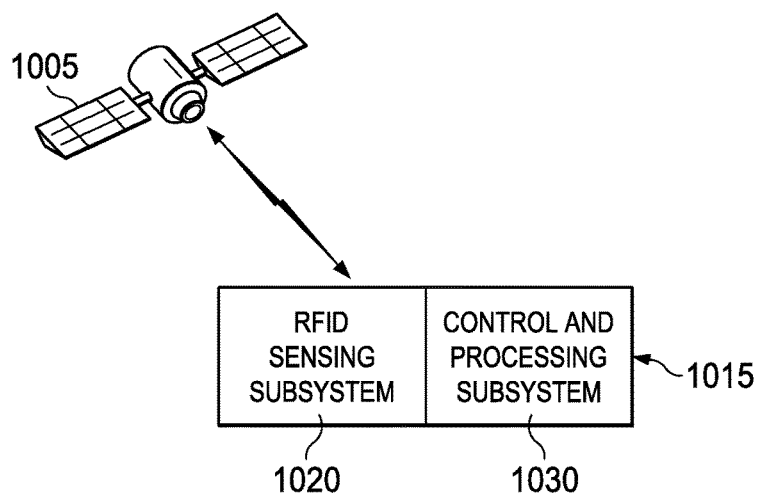
FIG. 10 illustrates a block diagram of an embodiment of an interrogation system demonstrating the capabilities associated with radio frequency identification according to the principles of the present invention.

Turning now to FIG. 10, illustrated is a block diagram of an embodiment of an interrogation system demonstrating the capabilities associated with radio frequency identification according to the principles of the present invention. The interrogation system includes an interrogator 1015 including an RFID sensing subsystem 1020 and a control and processing subsystem 1030 that energizes an RFID tag 1005 and then receives, detects and decodes the encoded RF energy (reflected or transmitted) from the RFID tag 1005. The control and processing subsystem 1030 provides overall control of the functions of the interrogator 1015 as well as any reporting functions. The interrogator 1015 may also include a user interface, communications subsystem, a power source and other subsystems as described above.

Additionally, the interrogation system may be employed with multiple RFID objects and with different types of RFID tags. For example, the RFID tags may be passive, passive with active response, and fully active. For a passive RFID tag, the transmitted energy provides a source to charge an energy storage device within the RFID tag. The stored energy is used to power a response from the RFID tag wherein a matching impedance and thereby a reflectivity of the RFID tag is altered in a coded fashion of ones ("1") and zeros ("0"). At times, the RFID tag will also contain a battery to facilitate a response therefrom. The battery can simply be used to provide power for the impedance matching/mismatching operation described above, or the RFID tag may even possess an active transmitting function and may even respond at a frequency different from a frequency of the interrogator. Any type of tag (e.g., RFID tag) whether presently available or developed in the future may be employed in conjunction with the interrogation system. Additionally, the RFID objects may include more than one RFID tag, each carrying different information (e.g., object specific or sensors reporting on the status of the object) about the RFID object. The RFID tags may also include more than one integrated circuit, each circuit including different coded information for a benefit of the interrogation system.

Figure 11:
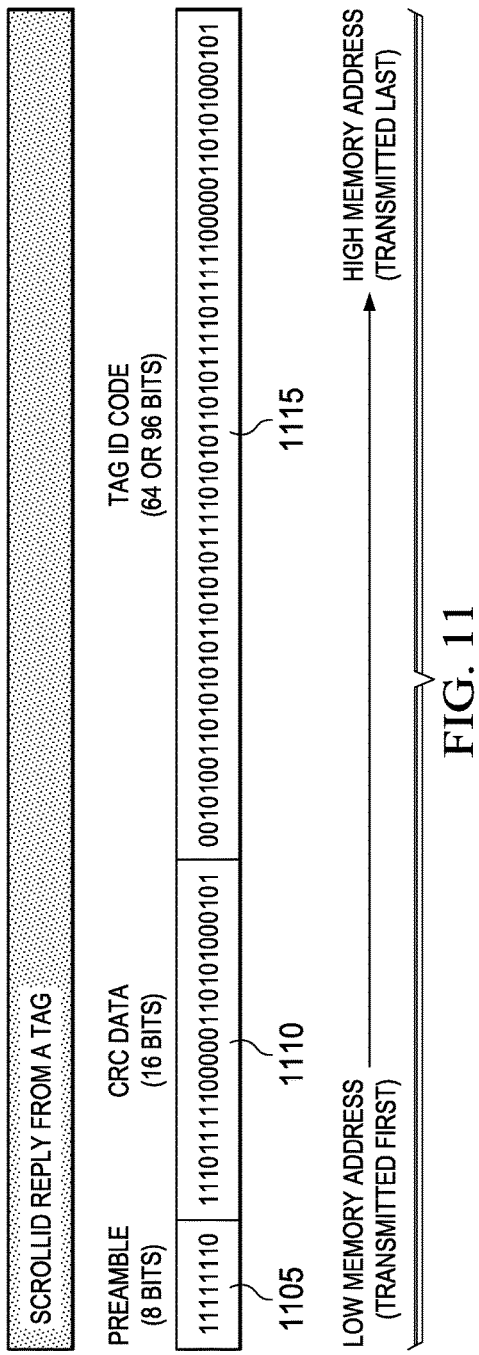
FIG. 11 illustrates a block diagram of an embodiment of a reply code from an RFID tag in response to a query by an interrogator constructed according to the principles of the present invention.

Turning now to FIG. 11, illustrated is a block diagram of an embodiment of a reply code from an RFID tag in response to a query by an interrogator constructed according to the principles of the present invention. In the present embodiment, the reply code includes three sections, namely, a preamble 1105, a cyclic redundancy check (CRC) 1110 to check for bit errors, and a tag identification (ID) code 1115 that uniquely specifies an RFID tag. In this example, the preamble 1105 is a fixed length having eight bits, the CRC 1110 is 16 bits and the tag ID code 1115 is either 64 or 96 bits. Of course, the length of the respective sections of the reply code and the sections that form the reply code may be modified including the addition of additional or different sections and still fall within the broad scope of the present invention.

The interrogator may employ the tag ID code 1115 to more definitively detect and identify a specific RFID tag and a digital signature associated with the RFID tag. More specifically, it is possible to detect an RFID tag employing portions of or the entirety of the reply code. As an example, the interrogator may employ the tag ID code 1115 only to detect a presence of an RFID tag or employ the additional bits available from the CRC 1110 as well as the preamble 1105 or other sections of the reply code to create a longer and more sensitive data stream for processing and identifying an RFID tag. Also, in a conventional reader mode and as noted above, the RFID tags may be detected via incoming RF energy and without apriori knowledge of any information about the RFID tag. In this instance, a relatively strong signal incident on the interrogator is preferable to generate a sufficiently positive signal to noise ratio (SNR) to reliably detect the incoming signal and, ultimately, the presence of the RFID tag.

Figure 12:
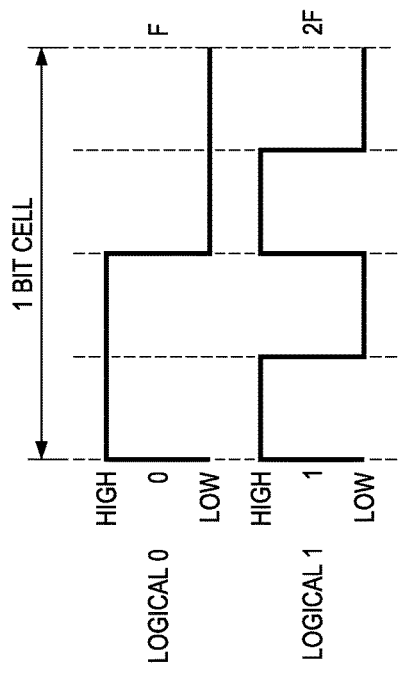
FIG. 12 illustrates a waveform diagram of an exemplary one-bit cell of a response from an RFID tag to an interrogator in accordance with the principles of the present invention.

Turning now to FIG. 12, illustrated is a waveform diagram of an exemplary one-bit cell of a response from an RFID tag to an interrogator in accordance with the principles of the present invention. With a logical "1" response, zero encoding is in a frequency shift keying (FSK) modulation format to distinguish logical "1" from logical "0," but an on/off nature of the backscatter return signal of the RFID tag is also actually an amplitude shift keying (ASK) signal. The shift in amplitude is detected by the interrogator and the frequency of operation determines whether the detection represents a logical "1" or logical "0." For a better understanding of RFID tags, see "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge Mass. 02139-4307, which is incorporated herein by reference.

The backscatter return signal is embodied in the response from an RFID tag. A low backscatter return signal is generated when the RFID tag provides a matched load so that any energy incident on the antenna of the RFID tag is dissipated within the RFID tag and therefore not returned to the interrogator. Alternatively, a high backscatter return signal is generated when the RFID tag provides a mismatched load so that any energy incident on the antenna of the RFID tag is reflected from the RFID tag and therefore returned to the interrogator. For more information, see "RFID Handbook," by Klaus Finkenzeller, published by John Wiley & Sons, Ltd., $2^{nd}$ edition (2003), which is incorporated herein by reference.

Figure 13:
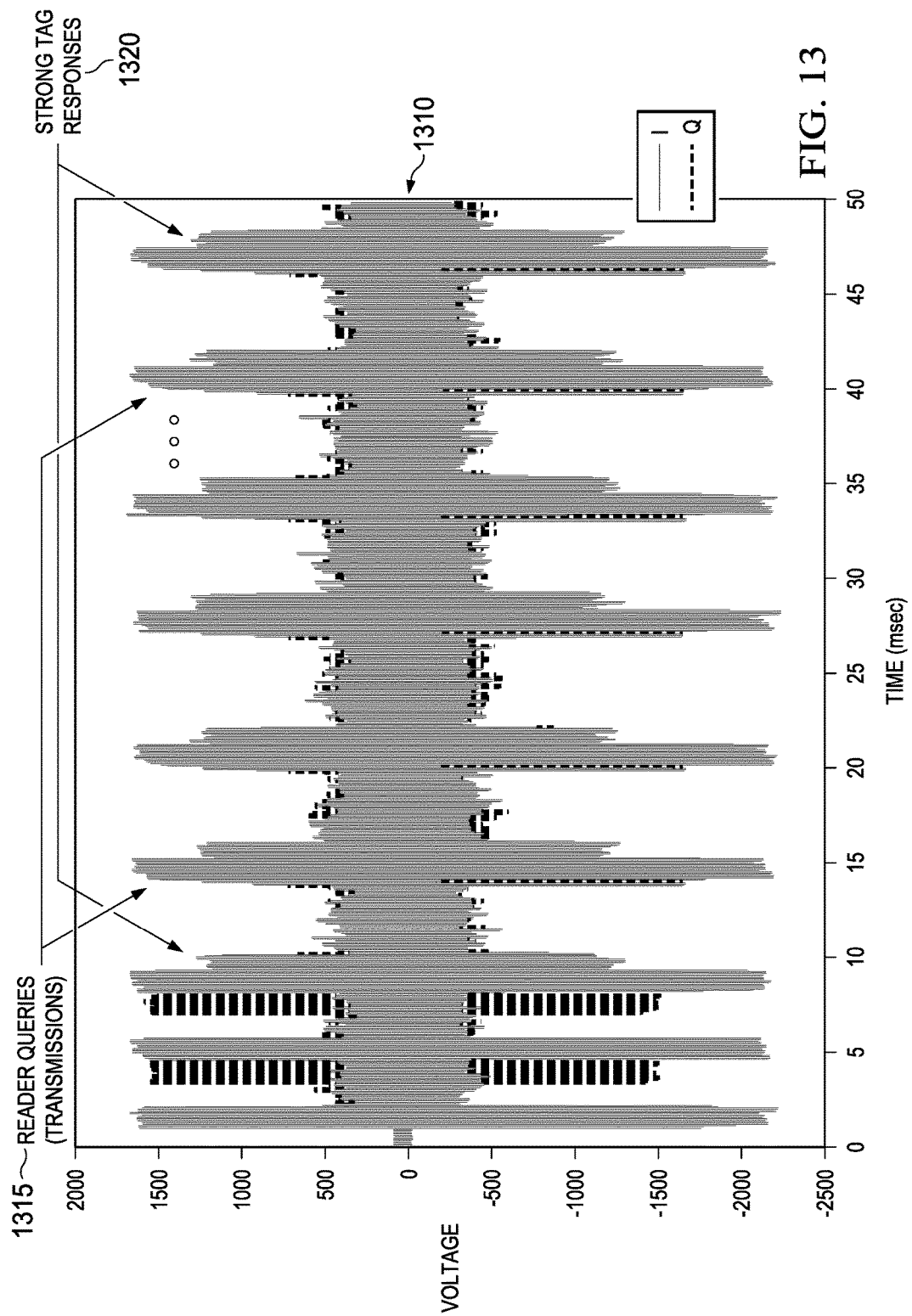
FIG. 13 illustrates a waveform diagram of an exemplary response from an RFID tag in accordance with the principles of the present invention.

Turning now to FIG. 13, illustrated is a waveform diagram of an exemplary response from an RFID tag in accordance with the principles of the present invention. The exemplary response includes recorded transmissions 1315 and backscatter return signals 1320 from the RFID tag under docile conditions. Under docile conditions, the response from the RFID tag is quite strong and substantially above the ambient noise level 1310 and an interrogator can more readily detect the response on an individual bit-by-bit basis.

Figure 14:
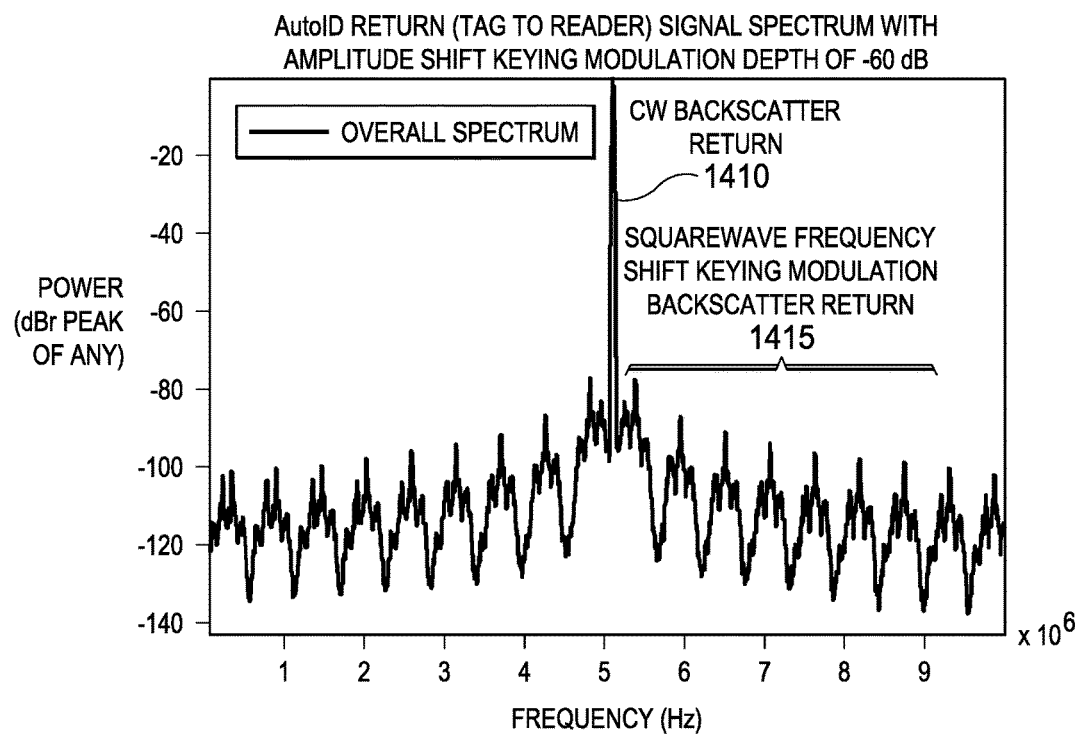
FIG. 14 illustrates a waveform diagram of a spectral response associated with the response from the RFID tag illustrated in FIG. 13.

Turning now to FIG. 14, illustrated is a waveform diagram of a spectral response associated with the response from the RFID tag illustrated in FIG. 13. As illustrated, the spectral response provides a strong signal in accordance with the response from the RFID tag under docile conditions. The signal is essentially in two distinct components. The first component is a strong backscatter return 1410, which is strongest in amplitude and at the center of the response. The second component is the lower amplitude FSK modulations backscatter return 1415 consisting of a series of peaks. In hostile environments or, more generally, when the response from the RFID tag is not as strong such as when the RFID tag is located at an increased range from the interrogator or the RFID tag is obstructed from the interrogator by absorptive or reflective materials, the backscatter return signals 1415 from the RFID tag to the interrogator are substantially weakened. Consequently, the detection and identification of the RFID tag is much more difficult and an interrogator architecture that can accommodate an improved signal to noise detection capability under adverse conditions while not increasing the probability of erroneous responses would be advantageous. As will become more apparent, an interrogator and interrogation system constructed according to the principles of the present invention accommodates reliable identification of the RFID tag under docile conditions and in hostile environments.

By way of example, consider a response from an RFID tag and the existence thereof to be a one-bit message, namely, the RFID tag is either present or not. Then, the presence of the RFID tag may be a logical "1" and an absence thereof may be a logical "0," or vice versa. Then, further consider the bits of the reply code (see, for instance, the reply code of FIG. 11) to be a spreading code for the one-bit message. Spreading codes are used in spread spectrum communications to provide additional gain from signal processing for weak signals. For a better understanding of spread spectrum technology, see an "Introduction to Spread Spectrum Communications," by Roger L. Peterson, et al., Prentice Hall Inc. (1995) and "Modern Communications and Spread Spectrum," by George R. Cooper, et al., McGraw-Hill Book Inc. (1986), both of which are incorporated herein by reference.

Further assume that a reference code (representing a reply code or portions thereof such as a tag ID code) is preloaded into an interrogator and the reply code from the RFID tag plus any noise are correlated against the reference code by a correlation subsystem within the interrogator. If a match occurs, an increase in a gain [in decibels (dB)] for the matched signal within the interrogator follows the relationships as set forth below:

$$\text{Gain Increase (dB)}=10\times\text{Log }10\ (N),$$

wherein "N" is the number of bits used in the correlation.

In a numerical example, if an RFID tag with a 64 bit tag ID code is used for the correlation, then the gain would be 18.06 dB. Additionally, if an RFID tag with a 96 bit tag ID code and an eight bit preamble and 16 bit CRC is used for the correlation, then the gain would be 20.79 dB. The gain corresponds to an improvement in the SNR as set forth above.

Figure 15:
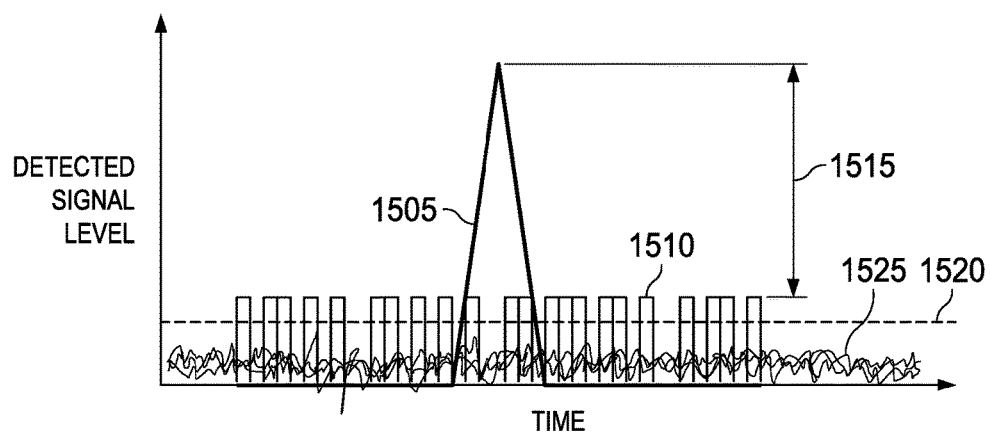
FIG. 15 illustrates a waveform diagram demonstrating a representative signal to noise gain employing an interrogator in accordance with the principles of the present invention.

Turning now to FIG. 15, illustrated is a waveform diagram demonstrating a representative signal to noise gain employing an interrogator in accordance with the principles of the present invention. Typically, a reply code associated with a response from an RFID tag is read on a bit-by-bit basis and each bit is detected on an individual basis. Under less than ideal conditions, the detected bits 1510 are often only slightly above an ambient noise level 1525 as illustrated in FIG. 15. Preferably, an interrogator constructed according to the present invention reads the entire reply code and treats the reply code as a spreading code with the existence of the RFID tag being only a single data bit. Thus, the additional gain 1515 achieved by this approach produces a substantially larger signal 1505 which substantially expands a potential for a reliable detection process both of an obstructed RFID tag and with an RFID tag located at a greater distance from the interrogator.

The detection threshold 1520 is a level that should be sufficiently above noise so that false alarms do not readily occur such that a utility of the interrogator is defeated. Correspondingly, setting the detection threshold 1520 too high will detrimentally affect the sensitivity of the interrogator. Thus, calibrating the threshold of the interrogator provides more latitude in setting a threshold without adversely affecting a detection sensitivity thereof. The additional detection sensitivity may be advantageously used in several ways. For example, the additional detection sensitivity can be used to increase detection range to detect RFID tags when obscured by attenuating materials, or to substantially improve the statistical quality of a detection (or a non-detection). Thus, by correlating the reference code with incoming reply codes from RFID tags plus ambient noise, the presence of the RFID tags can be reliably detected when the reply codes from the RFID tags are at substantially lower signal levels than is presently possible.

Figure 16:
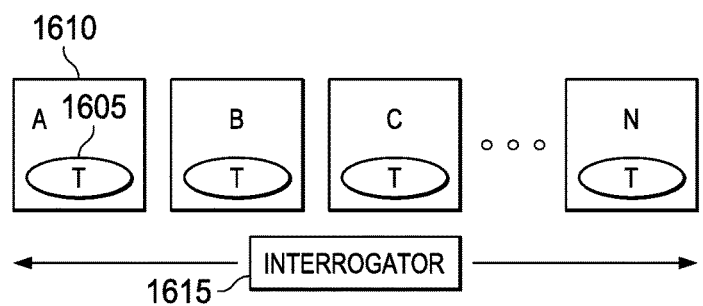
FIG. 16 illustrates a block diagram of an embodiment of an initialization stage of an interrogation system in accordance with the principles of the present invention.

Turning now to FIG. 16, illustrated is a block diagram of an embodiment of an initialization stage of an interrogation system in accordance with the principles of the present invention. During an optional pre-initialization stage, reference codes corresponding to the reply codes of the RFID tags 1605 on the RFID objects 1610 (designated A, B, C, . . . N) are logged into memory (e.g., a database) of an interrogator 1615 of the interrogation system. Then, during an initialization stage, the RFID objects 1610 are scanned by the interrogator 1615 at which time each individual reply code of the RFID tags 1605 is read and checked against the database of reference codes logged during the pre-initialization stage. If a pre-initialization stage is not performed, the reference codes corresponding to the reply codes of the RFID tags 1605 are logged into the database during the initialization stage.

During the initialization stage, the RFID tags 1605 are not typically obstructed so that identifying the reply codes of the RFID tags 1605 can be performed without employing a high level of sensitivity. When read in this manner, the tag ID code and other fields (which may serve as the reference code) corresponding to the reply code of the RFID tag 1605 can be captured using multiple amplitude bits (e.g., at least two) so that unique characteristics of an amplitude of the reply codes are also captured and can be used to increase the uniqueness associated with the RFID tag 1605 and employable during a subsequent correlation operation. While single bit detection is also possible and within the broad scope of the present invention, a single bit detection may be subject to a sensitivity degradation of a squaring loss thereof. The interrogator 1605 may also capture characteristics associated with the environment such as ambient background noise to further increase the sensitivity of the interrogator 1605.

There are several alternative methods to create the reference code. By directly scanning the RFID tag 1605 during the initialization stage, the most information about the RFID tag 1605 can be obtained to form the reference code. Alternatively, the reference code can be derived synthetically. To derive the reference code synthetically, the amplitude, phase and delay (timing of a response to an excitation signal) information of a particular type of RFID tag 1605 may be employed by the interrogator 1615 to derive the synthetic reference code. Another technique to derive the reference code is also a synthetically derived reference code employing one bit quantization. While the amplitude information may not be preserved for a one bit quantization, the frequency information of the response is typically preserved. As a one bit quantization is subject to squaring loss, quantization employing at least two bits may be preferable depending on the application. Higher level quantization captures amplitude information that reduces squaring loss and also obtains unique amplitude characteristics of specific RFID tags 1605 which enhances detection sensitivity.

In an alternative embodiment, the reference code corresponding to the reply code for the RFID tags 1605 can be input digitally via a keyboard or via a data port and a correlation pattern may be generated in the digital domain using one bit for each data bit. While amplitude information is not typically captured or used under these circumstances, the ambient noise information can still be collected to augment the sensitivity of the interrogator 1615. In yet another related embodiment, preloaded amplitude information may be input into the interrogator 1615 that matches amplitude characteristics of a reply code of an RFID tag 1605. As a result, a sensitivity of the interrogator 1615 is enhanced while, at the same time, taking advantage of digitally inputting the reference code corresponding to the reply code of the RFID tag 1605. Thereafter and during a post initialization stage, the correlation subsystem of the interrogator 1615 correlates between the reference code and a reply code from the RFID tags 1605 (when subsequently energized by the interrogator 1615) to enhance a detection sensitivity thereof.

Figure 17:
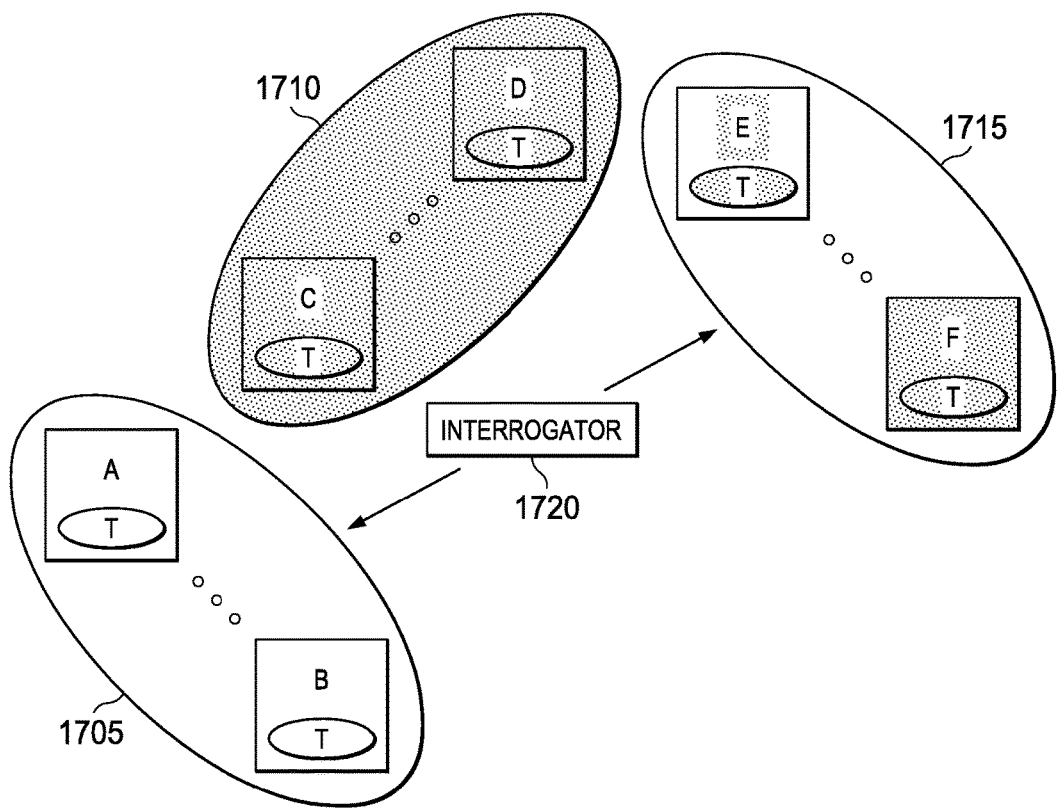
FIG. 17 illustrates a block diagram of an embodiment of a post initialization stage of an interrogation system in accordance with the principles of the present invention.

Turning now to FIG. 17, illustrated is a block diagram of an embodiment of a post initialization stage of an interrogation system in accordance with the principles of the present invention. In an exemplary manner, an interrogator 1720 is shown scanning across first, second and third sets of tagged items 1705, 1710, 1715 (also referred to as RFID objects). Here, the first set of tagged items 1705 represents unobstructed tags, while the second and third sets of tagged items 1710, 1715 represent obstructed, obscured, or more distant tags. In general, scanning unobstructed RFID tags can be read by an interrogator 1720 without employing a high level of sensitivity and may be read at substantial ranges (e.g., 15-20 feet). Under such circumstances, the interrogator 1720 may not employ a correlation operation. In contrast, scanning obstructed RFID tags (by an obstructing media or even at greater ranges) is preferably performed by an interrogator 1720 employing a higher level of sensitivity. Under such circumstances, the interrogator 1720 may employ a correlation subsystem to correlate between a reference code (previously logged) and a reply code for an RFID tag.

In such instances, the interrogator 1720 may correlate on small portions of a reply code from the RFID tag and provide an indication of a presence of the RFID tag. For example, correlating on the preamble provides a nine decibel increase in detection sensitivity when the preamble is eight bits long. While employing the preamble alone does not uniquely identify an RFID tag, it does, with high probability, indicate the presence of an RFID tag. Of course, the correlation subsystem may also employ a reference code to correlate against the entire reply code of the RFID tag depending on the particular application. Other detection techniques such as non-coherent averaging may be employed by the interrogator to uniquely identify an RFID tag.

Figure 18:
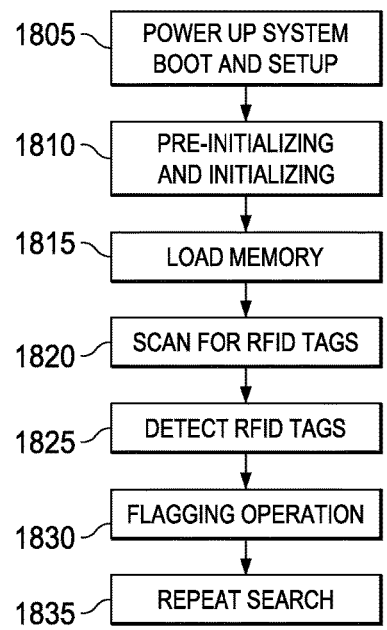
FIG. 18 illustrates a flow chart of an embodiment of a method of detecting an RFID tag according to the principles of the present invention.

Turning now to FIG. 18, illustrated is a flow chart of an embodiment of a method of detecting an RFID tag according to the principles of the present invention. The system is first powered up performing a system boot and setup 1805. This is typically followed by a preinitializing and initializing stage 1810. As mentioned above, during an initialization stage reference codes corresponding to the reply codes of the RFID tag are logged into the interrogator. The reference codes corresponding to the reply codes of the RFID tags are read by or logged into the interrogator, noting specific RFID tag characteristics along with RFID tag's ID code. This is typically done by loading the reference codes into memory and establishing a log within the interrogator during a load memory stage 1815. Thereafter and during the post initialization stage, the interrogator scans for the RFID tags during a scan stage 1820 (which may be a single scan or non-coherent integration) and, via the reply code, detects and logs the detection thereof during a detection stage 1825 (which may be located, individually and in groups, correlated with a log).

A correlation operation performed by the interrogator correlates between the reference codes and the reply codes from the RFID tags. Any reference codes previously logged, but not matched during the correlation operation, are flagged during a flagging stage 1830 via a user interface of the interrogator to the user (including audible queues or alarms), communications subsystem to a computer system, or other suitable techniques. Via alerts, the search is repeated during a repeat search stage 1835 with added sensitivity until the reference codes corresponding to the reply codes of previously logged RFID tags match the reply codes from the RFID tags detected during the post initialization stage. Returning to the interrogator in search mode, this is typically a first attempt at locating an RFID tag. When the searches are repeated, other approaches may be employed including multiple scans, highly localized scanning, or coherent integration as discussed later.

Figure 19:
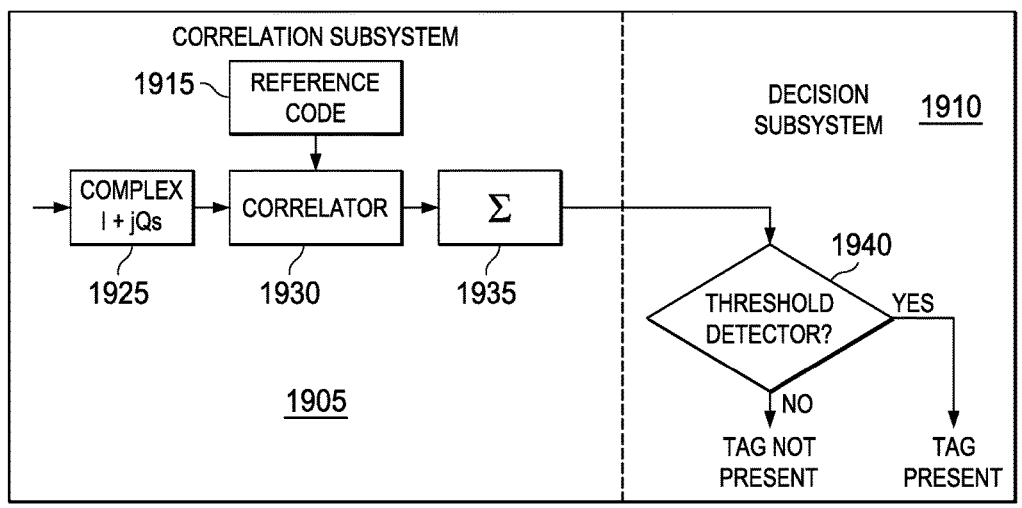
FIG. 19 illustrates a block diagram of portions of a control and processing subsystem of an interrogator constructed according to the principles of the present invention.

Turning now to FIG. 19, illustrated is a block diagram of portions of a control and processing subsystem of an interrogator constructed according to the principles of the present invention. The control and processing subsystem includes a correlation subsystem 1905 and a decision subsystem 1910. While in the illustrated embodiment the correlation subsystem and the decision subsystem form a portion of the control and processing subsystem such as within a digital signal processor thereof, those skilled in the art should understand that the subsystems may be discrete subsystems of the control and processing subsystem of the interrogator.

As mentioned above, the interrogator may employ a correlation operation to correlate between reference codes (generally designated 1915) corresponding to reply codes (generally designated 1925) from the RFID tags and subsequently received and digitized reply codes from the RFID tags to enhance a sensitivity of the interrogator. The reply codes are typically generated as complex I+jQ signals where I signifies the in phase portion of the signal and Q signifies its quadrature counterpart. The reference codes may be scanned in during the initialization stage or derived synthetically as hereinafter described. To derive the reference code synthetically, the amplitude, phase and delay (timing of a response to an excitation signal) information of a particular type of RFID tag may be employed by the interrogator to derive the synthetic reference code. The correlation occurs in a correlator 1930 wherein the reply code is correlated with the reference code. The correlation is mathematically analogous to a convolution operation. For a better understanding of convolution theory, see "An Introduction to Statistical Communication Theory," by John B. Thomas, published by John Wiley & Sons, Inc. (1969), which is incorporated herein by reference.

A stream of incoming data to the interrogator (corresponding to responses in the form of reply codes from the RFID tags) is correlated against preloaded reference codes loaded into a reference code database in time. Alternatively, samples of the incoming data may be gated in a block by the interrogator and then the data is correlated in block manner against the reference codes. In the latter example, a gating process is employed to gate the incoming data properly. Under such circumstances, it is preferable that apriori knowledge of a timing of the responses from the RFID tag in connection with a query by the interrogator better serves the process of gating the block of incoming data (i.e., the responses) from the RFID tags. Any known delay in the responses from the RFID tags can be preloaded in the interrogator during the initialization stage. An external sensor such as a position sensor (e.g., inertial sensor) may be employed by the interrogator to aid the correlation subsystem in predicting the timing of a response from the RFID tag. A synchronization pulse (derived from the transmit excitation signal) may also be employed to better define a timing of a response from an RFID tag.

The output of the correlator 1930 representing individual correlations of the reference code with incoming data is summed in a summer 1935 providing a correlation signal to improve the signal to noise ratio of the correlated signal. The correlation signal from the summer 1935 is typically input into a threshold detector 1940 within the decision subsystem 1910 to verify a presence of an RFID tag. The threshold detector 1940 typically compares the correlation signal with at least one threshold criteria or value (also referred to as threshold). The threshold may be fixed or dynamically determined. In one exemplary embodiment, where only a single threshold is present, an RFID tag is declared present if the correlation signal from the summer 1935 exceeds the threshold, and not present if the converse is true. In other embodiments, multiple thresholds may be used to indicate various levels of probabilities as to the likelihood that an RFID tag is present or not. This information may then be used to initiate selected or additional search modes so as to reduce remaining ambiguities.

Regarding the timing of the responses from the RFID tag, a tracking of the reply codes may suggest that the reply code is early, prompt or late. If the tracking suggests that the reply code is prompt (prompt output greater than early and later output), then a gating function is properly aligned to provide a significant correlator output. If the tracking suggests that the reply code is early, then the early correlator output is significant as compared to the late correlator output and the correlation subsystem 1905 is tracking too early and the requisite adjustment may be performed. An opposite adjustment may be performed if the tracking suggests that the reply code is late.

Another approach is to use a tracking loop that uses past successful detection performance to establish a gating process for subsequent correlations. In yet another embodiment relating to the correlation of the reply codes from the RFID tags is to perform Fast Fourier Transforms (FFTs) on both the reference code and a gated sample of the reply codes from the RFID tags. Then, a convolution operation in "Fourier Space" may be performed employing the convolution theorem. The convolution theorem states that the convolution of two functions is the product of the Fourier transforms thereof. An output of the correlation operation is typically envelope detected and several outputs may be averaged in a summing operation that preserves time characteristics of each individual detection.

Figure 20:
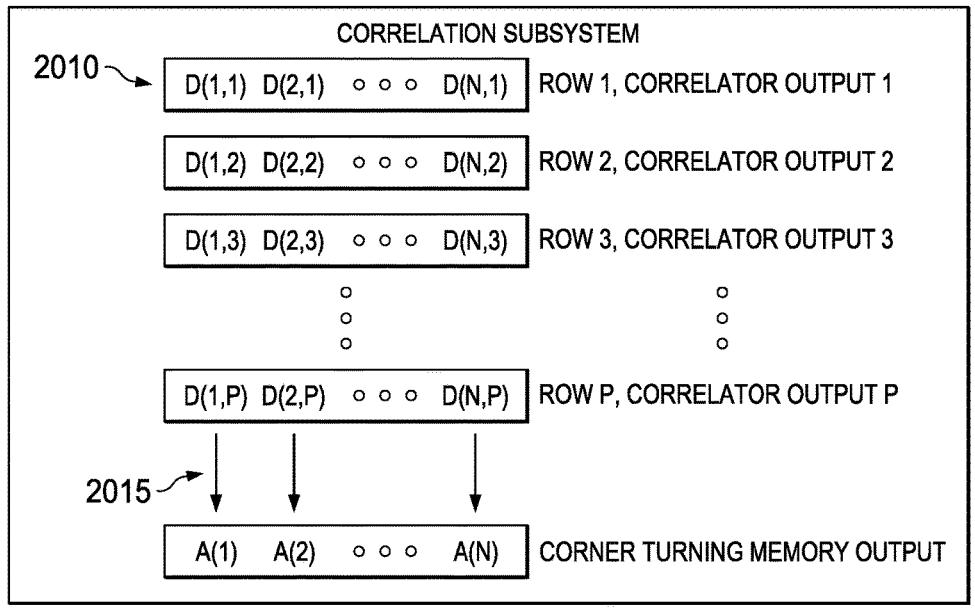
FIG. 20 illustrates a block diagram of an embodiment of portions of a correlation subsystem associated with a control and processing subsystem of an interrogator demonstrating an exemplary operation thereof in accordance with the principles of the present invention.

Turning now to FIG. 20, illustrated is a block diagram of an embodiment of portions of a correlation subsystem associated with a control and processing subsystem of an interrogator demonstrating an exemplary operation thereof in accordance with the principles of the present invention. In the present embodiment, a technique referred to as a "corner turning memory" is used in accordance with the correlation subsystem allowing a summing and averaging process for multiple correlations. An output of a correlator is read into memory by rows (one of which is designated 2010) with each row designating a single correlation. Then an output from the summing process (which embodies the memory or a function thereof) is generated by summing across individual columns (generally designated 2015, hence the name corner turning) applying an appropriate scaling factor. An output from the memory represents an average of "P" outputs of the correlation subsystem wherein "P" is the number of rows in the corner turning memory. Assuming a signal is located in every row of the corner turning memory, the improvement in SNR is increased by the square root of "P."

Using this approach, several options for enhancing performance of the interrogator are possible. For example, the results of different averaging times can be almost simultaneously compared and the modes of operation of the interrogator adjusted for enhanced performance. Also, this approach allows the sliding average technique (as described above) to be employed so that the output from the memory is an average over a predetermined period of time. Also, other averaging techniques in addition to the use of the corner turning memory are also well within the broad scope of the present invention.

Figure 21:
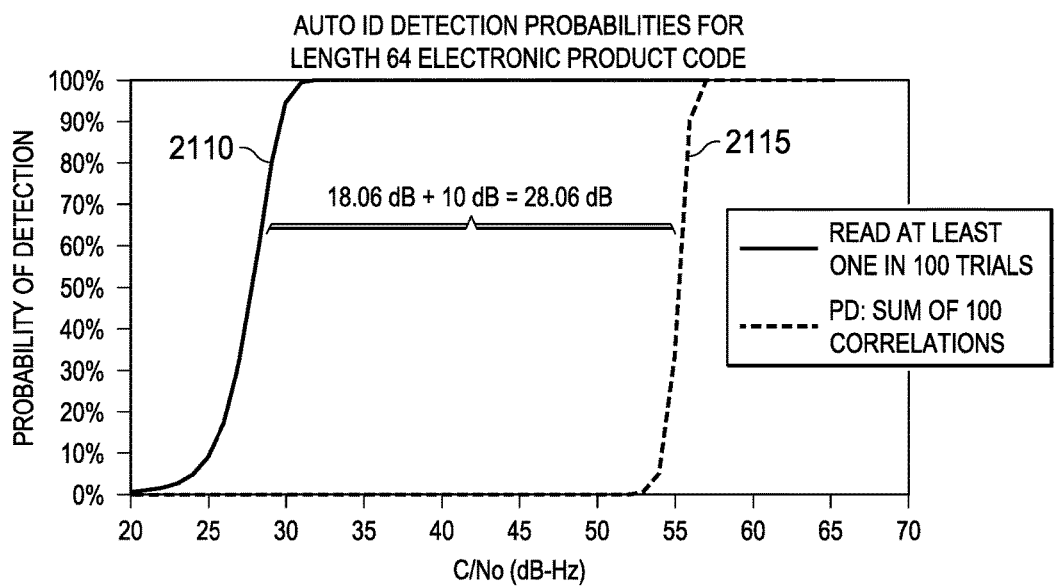
FIG. 21 illustrates a waveform diagram demonstrating exemplary advantages associated with the correlation subsystem described with respect to FIGS. 19 and 20.

Turning now to FIG. 21, illustrated is a waveform diagram demonstrating exemplary advantages associated with the correlation subsystem described with respect to FIGS. 19 and 20. In the illustrated embodiment, a conventional waveform 2115 represents the probability of detection for a given carrier to noise ratio (C/No) of a conventional reader reading at least one out of 100 possible attempts. A total of 100 trials were averaged in accordance with the correlation subsystem and an improved waveform 2110 represents the increased probability of detection for a given C/No of an interrogator thereby demonstrating an improvement in SNR of 28.06 dB. This represents 18.06 dB due to correlation operation wherein a length 64 electronic product code (EPC) code was used, plus an additional 10 dB due to non-coherent averaging. A purpose of the correlation operation is to determine whether or not the output or averaged output of the interrogator represents a presence of an RFID tag. A threshold detector as herein described then interprets a correlation signal from the correlation subsystem and provides a decision if the output is of sufficient quality to indicate if an RFID tag is present or not and, if indeterminate, to perform a "deeper" or more "focused" search.

Figure 22:
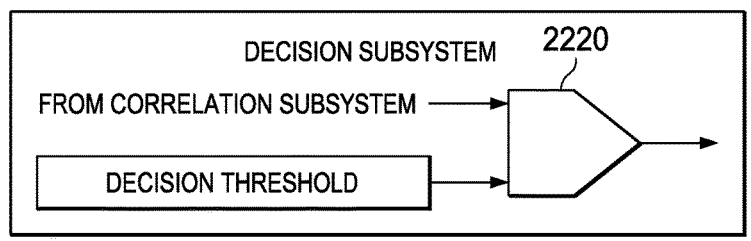
FIG. 22 illustrates a block diagram of an embodiment of a decision subsystem associated with a control and processing subsystem of an interrogator constructed according to the principles of the present invention.

Turning now to FIG. 22, illustrated is a block diagram of an embodiment of a decision subsystem associated with a control and processing subsystem of an interrogator constructed according to the principles of the present invention. In the illustrated embodiment, the decision subsystem is referred to as a threshold detector as it indicates a status on a correlation signal input from a correlation subsystem. A threshold detector 2220 provides at least two logical outputs, namely, a logical "1" and a logical "0." The output of the threshold detector may be a predetermined logical "1" or "0" if a threshold criteria is passed, and an alternate logical "1" or "0" if the threshold criteria is not passed. In short, the output is YES if an RFID tag is detected meaning that the input exceeds a threshold and NO if an RFID tag is not detected meaning that the input does not exceed the threshold.

A decision threshold for the threshold criteria may be embodied in several different ways as set forth below:
1. the threshold criteria may be a predetermined fixed value,
2. the threshold criteria may be a time varying value based on multiple efforts and averaging algorithms used to detect an RFID tag,
3. the threshold criteria may be related to the number of rows used for averaging in the corner turning memory as described above,
4. the threshold criteria may be influenced by ambient conditions (for example, noise) detected in the environment during the initialization stage as described above,
5. the threshold criteria may be determined by a tolerated level of false alarms or missed detections, or
6. the threshold criteria may be determined by whether a cursory or very extensive ("deep" or "focused") search has been directed by the control and processing subsystem. Other threshold criteria are clearly within the broad scope of the present invention. Also, a noise meter may be employed within the threshold criteria for the threshold detector 2220.

Additionally, more than two outputs may also be present to indicate states of the presence or non-presence of the RFID tag and may exist with lower criteria. For example, an indication may be provided that an RFID tag "may" be present, however the statistical criteria for false alarm may not have been met. This information may be useful and presented in a user interface (e.g., a display or data output), or it may also be used by the control and processing subsystem to change or adjust an operating mode in the interrogator to resolve the ambiguity and direct subsequent actions.

Figure 23:
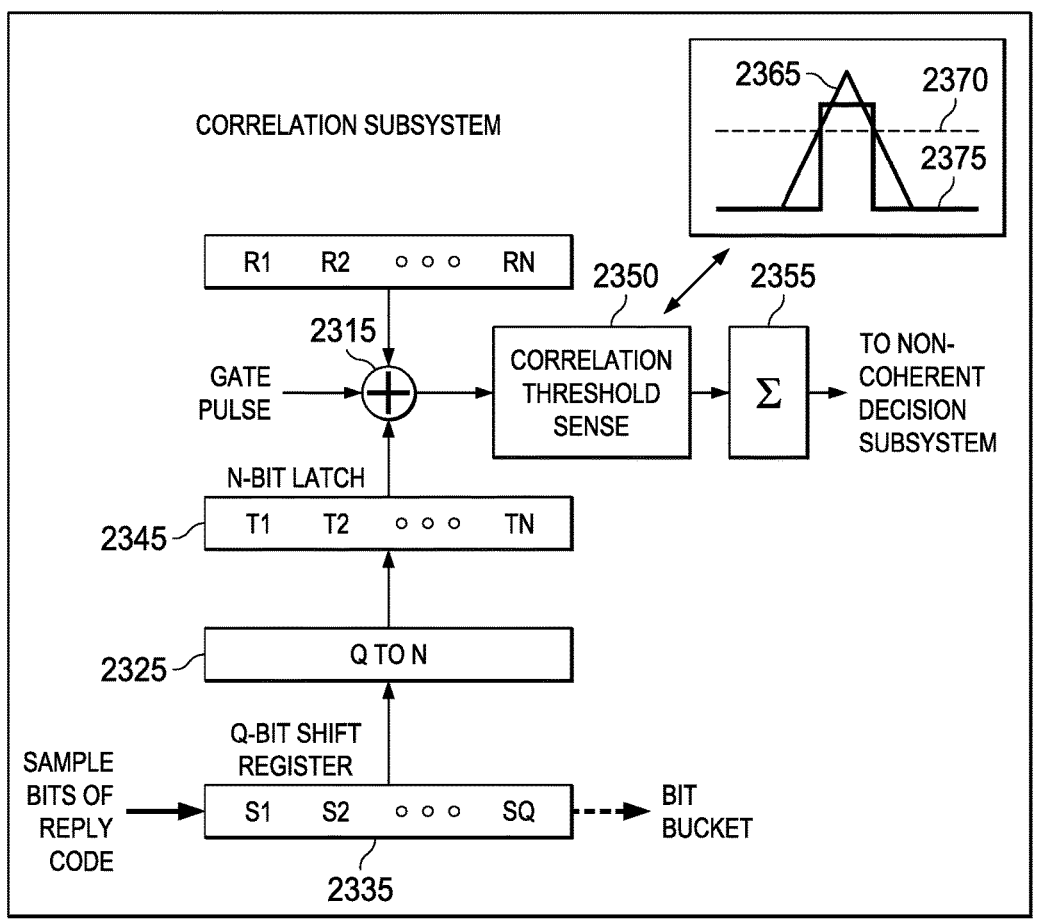
FIG. 23 illustrates a block diagram of an embodiment of a correlation subsystem associated with a control and processing subsystem of an interrogator constructed according to the principles of the present invention.

Turning now to FIG. 23, illustrated is a block diagram of an embodiment of a correlation subsystem associated with a control and processing subsystem of an interrogator constructed according to the principles of the present invention. A selected number of reference bits R1 . . . RN associated with reference codes corresponding to reply codes of RFID tags are latched and fed into one input of a correlator 2315 one bit at a time. A stream of derived sample bits T1 . . . TN (corresponding to sample bits S1 . . . SQ of the reply codes from the RFID tags) are input to the correlator 2315 at substantially the same time. A gate pulse from a gating clock synchronizes the inputs to the correlator 2315 at the proper time. Additionally, a Q to N operation 2325 (where "Q" is the length of the shift register 2335 that receives the sample bits S1 . . . SQ and "N" is the size of a latch 2345) is performed wherein the derived sample bits T1 . . . TN from the sampled bits S1 . . . SQ are input into a latch 2345 of the correlation subsystem. Bits reaching the output of the shift register 2335 are typically discarded.

If time synchronization between the reference bits R1 . . . RN and the derived sample bits T1 . . . TN is correct, a signal from the correlator 2315 will be highly correlated resulting in a large output signal to the correlation threshold sense 2350. Also, the output signal will vary in amplitude for the derived sample bits T1 . . . TN corresponding to the bits of the reply code that are before and after a high level of correlation. If time synchronization is not proper or if the reply code is not present, then the correlation function will provide a noisy output. The gating clock is typically shiftable in time and phase to search for a proper alignment between the two signals. To achieve proper alignment, a correlation subsystem employing a single correlator can search across time and phase with respect to the transmission of an excitation signal. Alternatively, a correlation subsystem that employs multiple correlators can be set to slightly different time and phase settings to simultaneously search across a larger phase and frequency space.

The correlation threshold sense 2350 is similar to the threshold detector illustrated and described with respect to FIG. 22. A threshold of the correlation threshold sense 2350 is typically set quite low to allow for a reasonable averaging to occur in subsequent processing. In this context, the correlation threshold sense 2350 may be considered a pre-filter to a decision subsystem. In an alternative embodiment, the correlation threshold sense 2350 may be performed in the decision subsystem. An output of the correlation threshold sense 2350 is then input to a summer 2355, which after multiple transmissions and detections (non-coherent integration) provides a correlation signal to the decision subsystem.

In an exemplary embodiment, the correlation threshold sense 2350 receives an output from an exclusive OR function that performs a bit-by-bit operation on the reference bits R1 . . . RN and the derived sample bits T1 . . . TN. Multiple outputs of the exclusive OR function are accumulated in the correlation threshold sense 2350 and compared to a threshold value. If the outputs of the exclusive OR function exceed the threshold value, a relatively good indication is provided of a location of a peak of a correlation triangle. Otherwise, a relatively good indication is provided that the peak of the correlation triangle either is outside of the sampled bits S1 . . . SN or that the peak of the correlation triangle is not substantially centered within the sampled bits S1 . . . SN. The accumulated outputs of the exclusive OR function are thereafter transmitted to the summer 2355 which may include a corner turning memory (see FIG. 20) for further processing. In the environment of the corner turning memory, each accumulated output of the exclusive OR function represents a data bit (such as D(1, P)) of a row of the corner turning memory.

An exemplary correlation triangle 2365 in reference to a threshold value is illustrated in FIG. 23. Within the correlation threshold sense 2350, a threshold detector provides a high signal when the accumulated outputs of the exclusive OR function exceed a threshold value 2370 and, otherwise, provide a low signal. A resulting pulse or signal 2375 as illustrated in FIG. 23 may be employed to ascertain (e.g., estimate) a location of a peak of the correlation triangle 2365.

Figure 24:
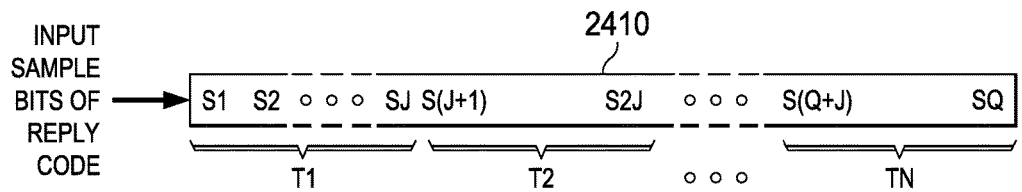
FIG. 24 illustrates a block diagram of an embodiment of portions of a correlation subsystem associated with of a control and processing subsystem of an interrogator constructed according to the principles of the present invention.

Turning now to FIG. 24, illustrated is a block diagram of an embodiment of portions of a correlation subsystem associated with a control and processing subsystem of an interrogator constructed according to the principles of the present invention. In particular, the present embodiment demonstrates a Q to N operation, wherein "Q" is the length of a shift register 2410 that receives the sample bits S1 . . . SQ of the reply codes from the RFID tags and "N" is the size of a latch. The incoming data including the reply code from the RFID tags is sampled at a rate higher than the signal rate of the reply code to generate the sampled bits S1 . . . SQ. Then the Q to N conversion occurs by summing successive consecutive sequences of J bits, where Q=J×N and "J" is the number of sampled bits in a sequence. As a result, derived sample bits T1 . . . TN are derived from the sample bits S1 . . . SQ. Appropriate scaling factors are then applied to the derived sample bits T1 . . . TN and the reference bits to account for the summing operation.

Figure 25:
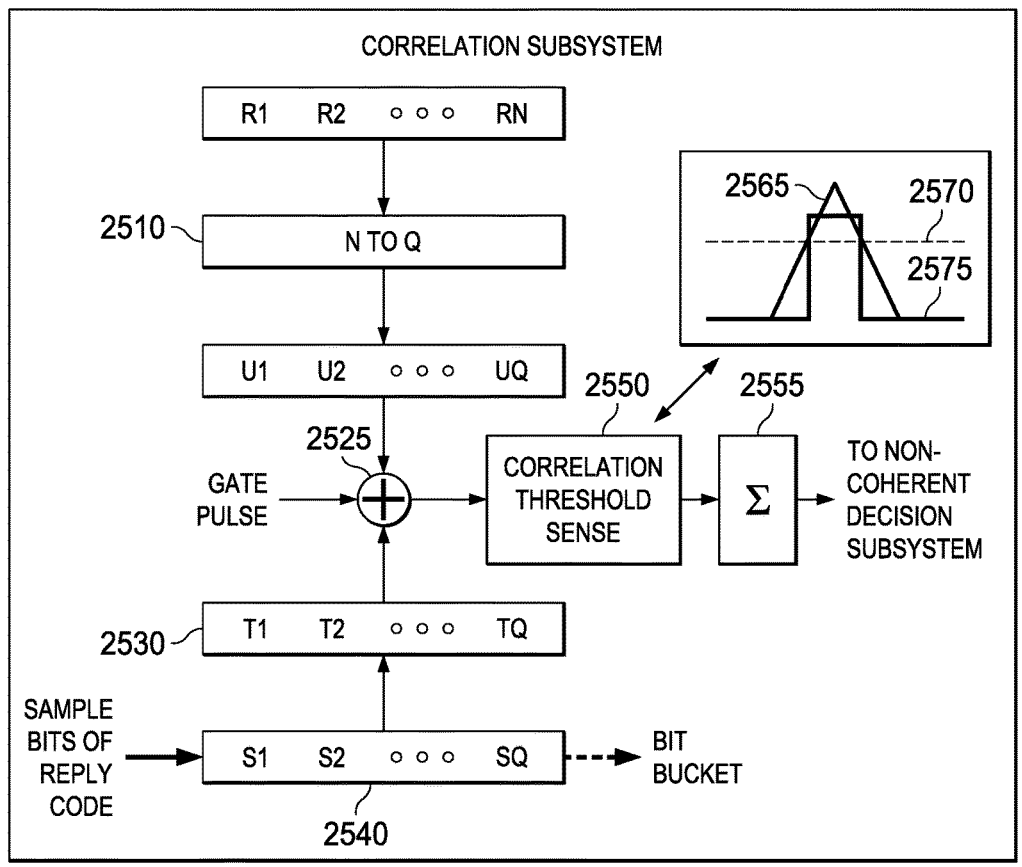
FIG. 25 illustrates a block diagram of another embodiment of a correlation subsystem associated with a control and processing subsystem of an interrogator constructed according to the principles of the present invention.

Turning now to FIG. 25, illustrated is a block diagram of another embodiment of a correlation subsystem associated with a control and processing subsystem of an interrogator constructed according to the principles of the present invention. In contrast to other embodiments of the correlation subsystem wherein a length of the incoming data including the sample bits S1 . . . SQ of the reply codes from the RFID tags is decreased from Q to N (see description with respect to FIG. 24 above), in the present embodiment the number of reference bits R1 . . . RN is increased to provide a set of derived reference bits U1 . . . UQ from a N to Q operation 2510. The N to Q operation 2510 is substantially opposite to the Q to N operation illustrated and described with respect to FIG. 24. An output of the N to Q operation is then input to a correlator 2525. Additionally, the correlation subsystem employs a higher sampling rate with output results (after application of the proper scaling factors) analogous to the correlation subsystem illustrated and described with respect to FIG. 23.

A gate pulse from a gating clock synchronizes the inputs to the correlator 2525 at the proper time. Additionally, derived sample bits T1 . . . TQ are latched into a Q bit latch 2530 of the correlation subsystem. These bits are a result of sample bits of a reply code clocking through a shift register 2540. Bits reaching the output of the shift register 2540 are typically discarded.

As in FIG. 23, if time synchronization between the derived reference bits U1 . . . UQ and the derived sample bits T1 . . . TQ is correct, a signal from the correlator will be highly correlated resulting in a large output signal to the correlation threshold sense 2550. Also, the output signal will vary in amplitude for the sample bits T1 . . . TQ corresponding to the bits of the reply code that are before and after a high level of correlation. If time synchronization is not proper or if the reply code is not present, then the correlation function will provide a noisy output. The gating clock is typically shiftable in time and phase to search for a proper alignment between the two signals. To achieve proper alignment, a correlation subsystem employing a single correlator can search across time and phase with respect to the transmission of an excitation signal. Alternatively, a correlation subsystem that employs multiple correlators can be set to slightly different time and phase settings to simultaneously search across a larger phase and frequency space.

The correlation threshold sense 2550 is similar to the threshold detector illustrated and described with respect to FIG. 22. A threshold of the correlation threshold sense 2550 is typically set quite low to allow for a reasonable averaging to occur in subsequent processing. In this context, the correlation threshold sense 2550 may be considered a pre-filter to the decision subsystem. In an alternative embodiment, the correlation threshold sense 2550 may be performed in the decision subsystem. An output of the correlation threshold sense 2550 is then input to a summer 2555, which after multiple transmissions and detections (non-coherent integration) provides a correlation signal to a decision subsystem.

In an exemplary embodiment, the correlation threshold sense 2550 receives an output from an exclusive OR function that performs a bit-by-bit operation on the derived reference bits U1 . . . UQ and the derived sample bits T1 . . . TQ. Multiple outputs of the exclusive OR function are accumulated in the correlation threshold sense 2550 and compared to a threshold value. If the outputs of the exclusive OR function exceed the threshold value, a relatively good indication is provided of a location of a peak of a correlation triangle. Otherwise, a relatively good indication is provided that the peak of the correlation triangle either is outside of the sampled bits S1 . . . SQ or that the peak of the correlation triangle is not substantially centered within the sampled bits S1 . . . SQ. The accumulated outputs of the exclusive OR function are thereafter transmitted to the summer which may include a corner turning memory (see FIG. 20) for further processing. In the environment of the corner turning memory, each accumulated output of the exclusive OR function represents a data bit (such as D(1, P)) of a row of the corner turning memory.

An exemplary correlation triangle 2565 in reference to a threshold value 2570 is illustrated in FIG. 25. Within the correlation threshold sense 2550, a threshold detector provides a high signal when the accumulated outputs of the exclusive OR function exceed the threshold value 2570 and, otherwise, provide a low signal. A resulting pulse 2575 as illustrated in FIG. 25 may be employed to ascertain (e.g., estimate) a location of a peak of the correlation triangle 2565.

Figure 26:
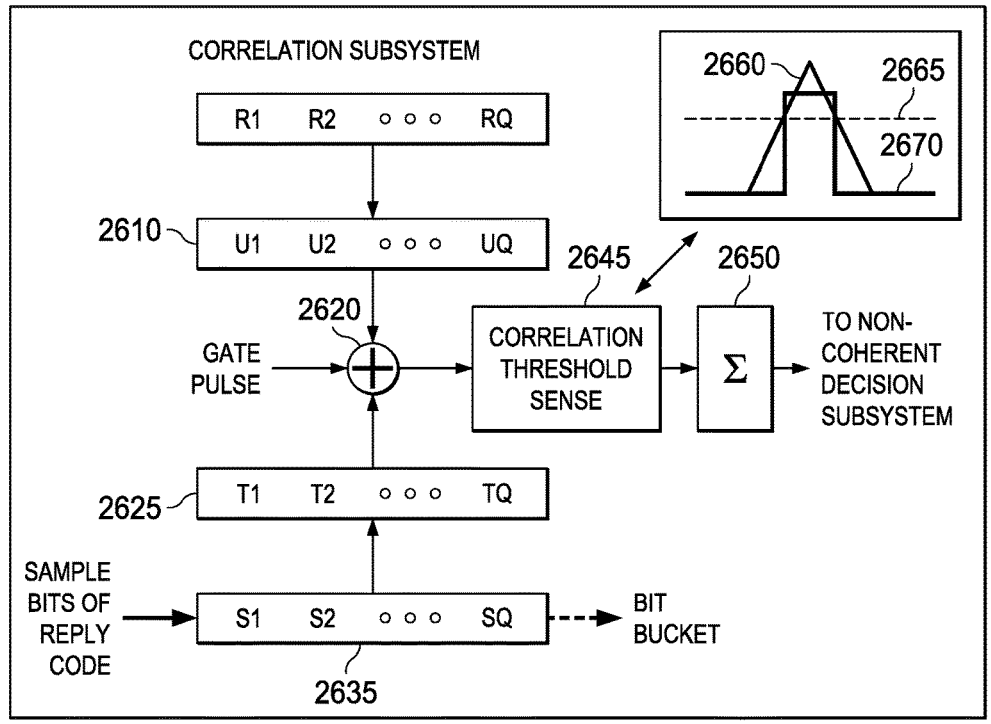
FIG. 26 illustrates a block diagram of yet another embodiment of a correlation subsystem associated with a control and processing subsystem of an interrogator constructed according to the principles of the present invention.

Turning now to FIG. 26, illustrated is a block diagram of yet another embodiment of a correlation subsystem associated with a control and processing subsystem of an interrogator constructed according to the principles of the present invention. The reference code corresponding to a reply code of an RFID tag is captured during an initialization stage and stored as a higher number of reference bits R1 ... RQ. These bits are then latched into a Q-bit latch 2610 as derived reference bits U1 ... UQ and fed into one input of a correlator 2620 one bit at a time. A stream of derived sample bits T1 ... TQ (corresponding to sample bits S1 ... SQ of the reply codes from the RFID tags) are input to the correlator 2620 at substantially the same time. The correlation operation is then performed without employing the Q to N or N to Q conversion operation as set forth above. Performing the initialization stage with a higher number of bits (at the higher bit rate) captures more of the unique characteristics of the RFID tag and can be used to further aid the correlation subsystem. The aforementioned correlation subsystems perform a non-coherent integration of multiple samples (e.g., 100 samples). A gate pulse from a gating clock synchronizes the inputs to the correlator 2620 at the proper time. Additionally, a Q-bit latch 2625 is used to latch the derived sample bits T1 ... TQ into a latch 2625. Bits reaching the output of a shift register 2635 are typically discarded.

If time synchronization between the reference bits R1 ... RQ and the sample bits T1 ... TQ is correct, a signal from the correlator 2620 will be highly correlated resulting in a large output signal to a correlation threshold sense 2645. Also, an output signal will vary in amplitude for the derived sample bits T1 ... TQ corresponding to the bits of the reply code that are before and after a high level of correlation. If time synchronization is not proper or if the reply code is not present, then the correlation function will provide a noisy output. The gating clock is typically shiftable in time and phase to search for a proper alignment between the two signals. To achieve proper alignment, a correlation subsystem employing a single correlator can search across time and phase with respect to the transmission of an excitation signal. Alternatively, a correlation subsystem that employs multiple correlators can be set to slightly different time and phase settings to simultaneously search across a larger phase and frequency space.

The correlation threshold sense 2645 is similar to the threshold detector illustrated and described with respect to FIG. 22. A threshold of the correlation threshold sense 2645 is typically set quite low to allow for a reasonable averaging to occur in subsequent processing. In this context, the correlation threshold sense 2645 may be considered a prefilter to the decision subsystem. In an alternative embodiment, the correlation threshold sense 2645 may be performed in the decision subsystem. An output of the correlation threshold sense 2645 is then input to a summer 2650, which after multiple transmissions and detections (non-coherent integration) provides a correlation signal to a decision subsystem.

In an exemplary embodiment, the correlation threshold sense 2645 receives an output from an exclusive OR function that performs a bit-by-bit operation on the derived reference bits U1 ... UQ and the derived sample bits T1 ... TQ. Multiple outputs of the exclusive OR function are accumulated in the correlation threshold sense 2645 and compared to a threshold value. If the outputs of the exclusive OR function exceed the threshold value, a relatively good indication is provided of a location of a peak of a correlation triangle. Otherwise, a relatively good indication is provided that the peak of the correlation triangle either is outside of the sampled bits S1 ... SQ or that the peak of the correlation triangle is not substantially centered within the sampled bits S1 ... SQ. The accumulated outputs of the exclusive OR function are thereafter transmitted to the summer 2650 which may include a corner turning memory (see FIG. 20) for further processing. In the environment of the corner turning memory, each accumulated output of the exclusive OR function represents a data bit (such as D(1, P)) of a row of the corner turning memory.

An exemplary correlation triangle 2660 in reference to a threshold value 2665 is illustrated in FIG. 26. Within the correlation threshold sense 2645, a threshold detector provides a high signal when the accumulated outputs of the exclusive OR function exceed the threshold value 2665 and, otherwise, provide a low signal. A resulting pulse 2670 as illustrated in FIG. 26 may be employed to ascertain (e.g., estimate) a location of a peak of the correlation triangle 2660.

Looking at any of the sample(s) and in accordance with the aforementioned discussion regarding FIG. 23, et seq. by performing a bit-for-bit exclusive OR function between the reference bits R and derived sample bits T from the sample bits S and shifting the derived sample bits T from the sample bits S one bit at a time and performing another bit-for-bit exclusive OR, the correlator derives a correlation triangle when the reply code from the RFID tag is present (which may be sufficient to detect the RFID tag). If the correlation triangle is undistinguishable (maybe weak signal or high ambient noise), the correlation subsystem then repeats the aforementioned function (and maybe many times over) on yet another reply code(s) and the correlator derives yet another correlation triangle, in such circumstances, the results are then integrated (e.g., bit for bit summation) of the correlation triangles to derive a non-coherent integration of multiple reply codes.

As illustrated and described, the previously introduced embodiments of the correlation subsystem employ a gated correlation operation as the signal (reply code) to be correlated is captured in a block and then gated through the correlation subsystem in a serial fashion, at least one bit at a time. For strong signal conditions, a single sampling and correlation will often be sufficient to determine a presence of an RFID tag. For conditions where the signals are not as strong, the number of summed samples increases to be greater than one. An improvement in the SNR may result, in part, from a summing operation and the improvement may increase as the square root of the number of samples averaged before being input to the decision subsystem. The aforementioned summing or integration functionality may be referred to as non-coherent integration.

Figure 27:
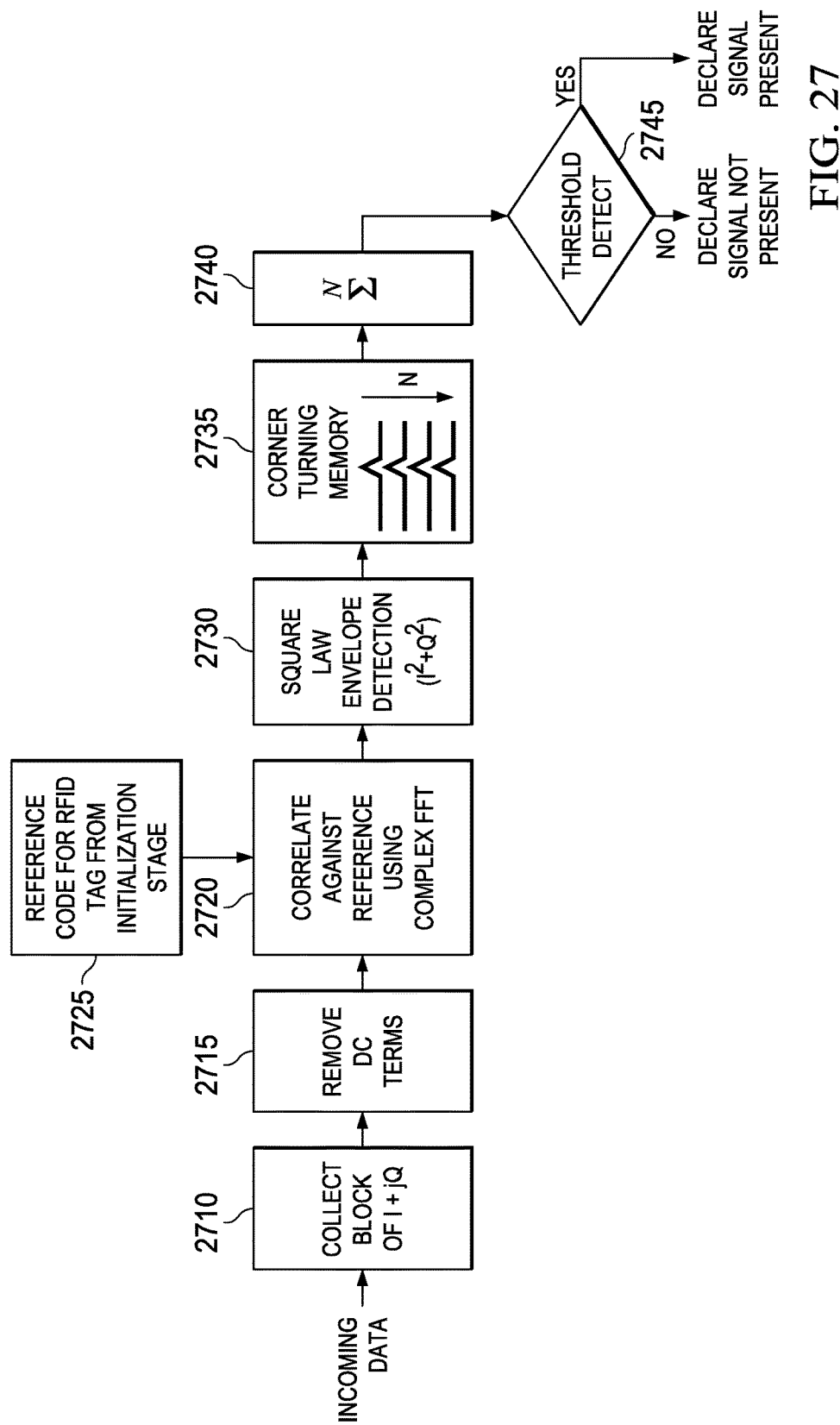
FIGS. 27 and 28 illustrate block diagrams of embodiments of Fast Fourier Transform operations employable with a correlation subsystem associated with the control and processing subsystem of the interrogator constructed according to the principles of the present invention.
Figure 28:
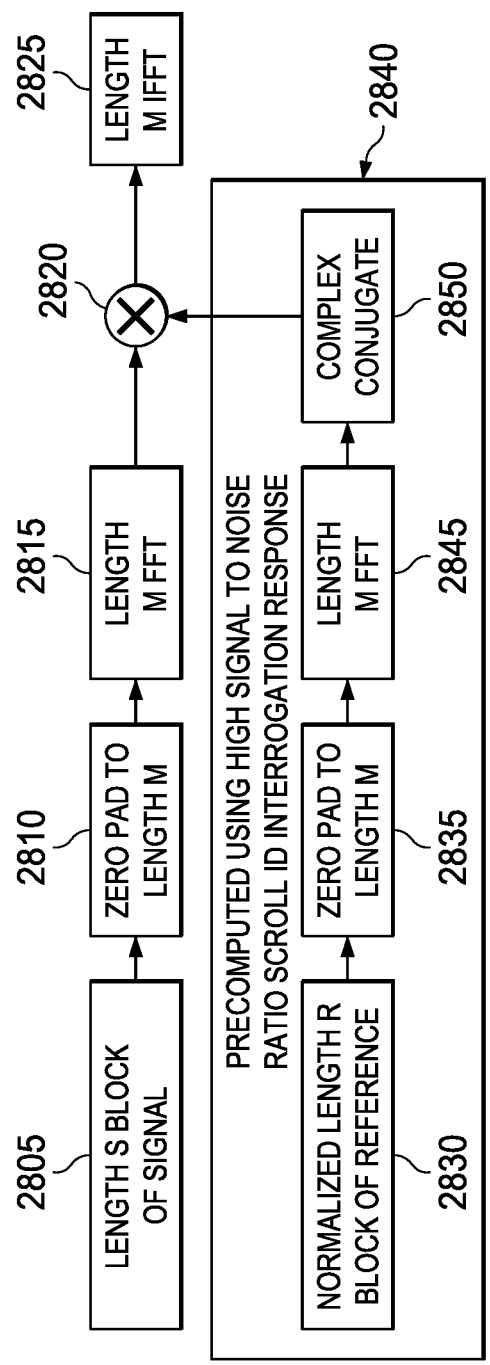

Turning now to FIGS. 27 and 28, illustrated are block diagrams of embodiments of a Fast Fourier Transform (FFT) operation employable with a correlation subsystem associated with the control and processing subsystem of the interrogator constructed according to the principles of the present invention. As mentioned above, convolution theorem may be performed in conjunction with a FFT operation. A FFT is performed on the reply code and the stored reference code from the initialization stage (see FIG. 27). The reply code and reference code (or selected bits or sample bits thereof) are then complex multiplied and converted back to the time domain by an Inverse Fast Fourier Transform ("IFFT"). Zero padding is employed to substantially prevent aliasing.

With the exception of the FFT operations, the correlation subsystem is analogous to the correlation subsystems described above. The convolution theorem and the use of FFTs provides a computationally efficient technique of implementing a correlation subsystem. Additionally, aliasing in regions of non-interest (i.e., where a correlation triangle is not likely to exist) should not harm the results so that the length of the FFT may be shortened to improve computational efficiency. Also, in those instances where the range of variation is small, it may be preferable to employ dot product correlations for even further computational efficiency.

Referring once again to FIG. 27, incoming data is collected as a block of complex I and Q values 2710 followed by removing the DC terms 2715. These values are correlated 2720 against a reference code 2725 using the convolution theorem. Subsequent to correlation, a square law envelope detection function 2730 obtains amplitude information. This is then input to the corner turning memory function 2735 followed by a summer 2740 and then a threshold and detection function 2745, of which were discussed above.

Referring once again to FIG. 28, the specifics of the correlation operation 2720 is illustrated in detail. The incoming data of length S 2805 is increased to length M by zero padding 2810 to assure the data is of an appropriate length for an FFT operation 2815. In the same manner, the normalized length R of the reference code 2830 is also increased to length M by a zero pad 2835, to which is then performed a length M FFT 2845 and a complex conjugate 2850 of the result performed. A complex term by term multiplication 2820 is performed and a length M IFFT 2825 is performed to complete the function.

In the presence of noise, or during very weak signal conditions, the correlation subsystem may erroneously correlate on noise. The interrogator substantially reduces those effects by comprehending that actual correlations do not have a single correlation peak, but a major peak that is surrounded by smaller correlation peaks. The aforementioned characteristics are referred to as sidelobes or time sidelobes.

Figure 29:
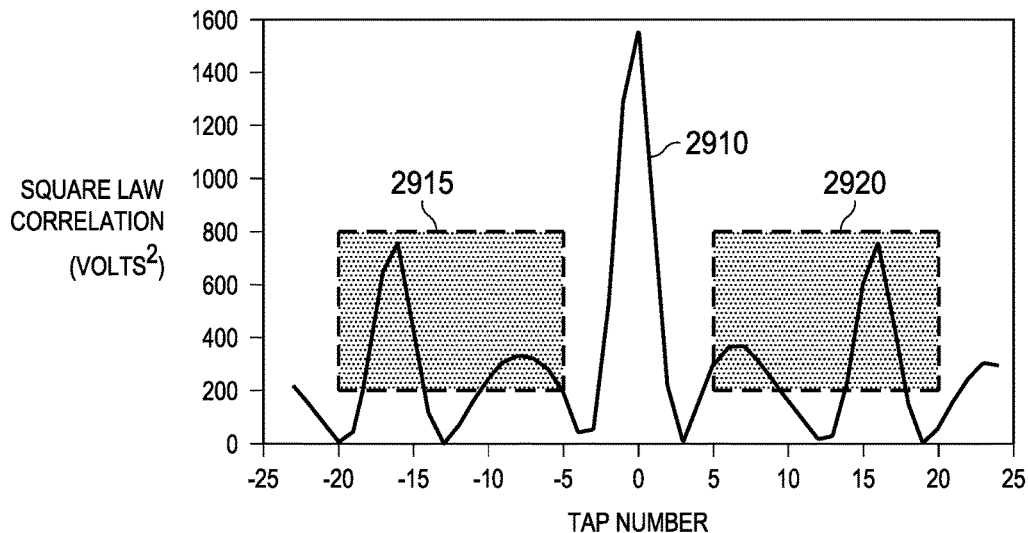
FIG. 29 illustrates a waveform diagram demonstrating the sidelobes associated with the correlation subsystem in accordance with the principles of the present invention.

Turning now to FIG. 29, illustrated is a waveform diagram demonstrating the sidelobes associated with the correlation subsystem in accordance with the principles of the present invention. Understanding the nature of the sidelobes and using their characteristics within a predetecting function can enhance the correlation subsystem of the interrogator. As illustrated, the correlation includes a major peak 2910 (referred to as "prompt") and two smaller peaks (generally referred to as "early" 2915 and "late" 2920) about the major peak. By averaging the noise in the early and late regions and comparing those values to noise levels recorded when it was known that no signal was present, additional confirmation is obtained that, in fact, an RFID tag is responding even if the RFID tag is not uniquely identifiable in a single response at the present signal levels. Then, by averaging multiple responses that correspond to RFID tag responses, the SNR will be raised to a level wherein substantially unambiguous detection occurs.

In this instance, the reply code of an RFID tag is not being detected, but the interrogator is detecting a change in ambient noise that substantially increases the probability that an RFID tag is indeed present. For example, sampling in all three regions and having the noise level be the same is a good indication that an RFID tag is not present and therefore that the sample should be discarded. However, sampling in all three areas and finding that the early and late levels are about equal and the middle level is larger is a good indication that a response from an RFID tag is in fact present and that this sample should be added into the averaging function. Clearly discarding samples that do not pass the early/late noise test will certainly discard data of actual RFID tags. That is a small price to pay, however, for not unduly corrupting the average with samples that do not in fact contain a reply code from an RFID tag. Sampling for slightly longer times compensates for the reduction in samples used. The control and processing subsystem can maintain a running total of how many samples were discarded so that the number of samples averaged will remain valid.

Regarding the timing of the responses from the RFID tag, a tracking of the reply codes may suggest that the reply code is early, prompt or late. If the tracking suggests that the reply code is prompt (prompt output greater than early and late output), then a gating function is properly aligned to provide a significant correlator output. If the tracking suggests that the reply code is early, then the early correlator output is significant as compared to the late correlator output and the correlation subsystem is tracking too early and the requisite adjustment may be performed. An opposite adjustment may be performed if the tracking suggests that the reply code is late.

Another approach is to use a tracking loop that uses past successful detection performance to establish a gating process for subsequent correlations. In yet another embodiment relating to the correlation of the reply codes from the RFID tags is to perform FFTs on both the reference code and a gated sample of the reply codes from the RFID tags. Then, a convolution operation in "Fourier Space" may be performed employing the convolution theorem. The convolution theorem states that the convolution of two functions is the product of the Fourier transforms thereof. An output of the correlation operation is typically envelope detected and several outputs may be averaged in a summing operation that preserves time characteristics of each individual detection.

Figure 30:
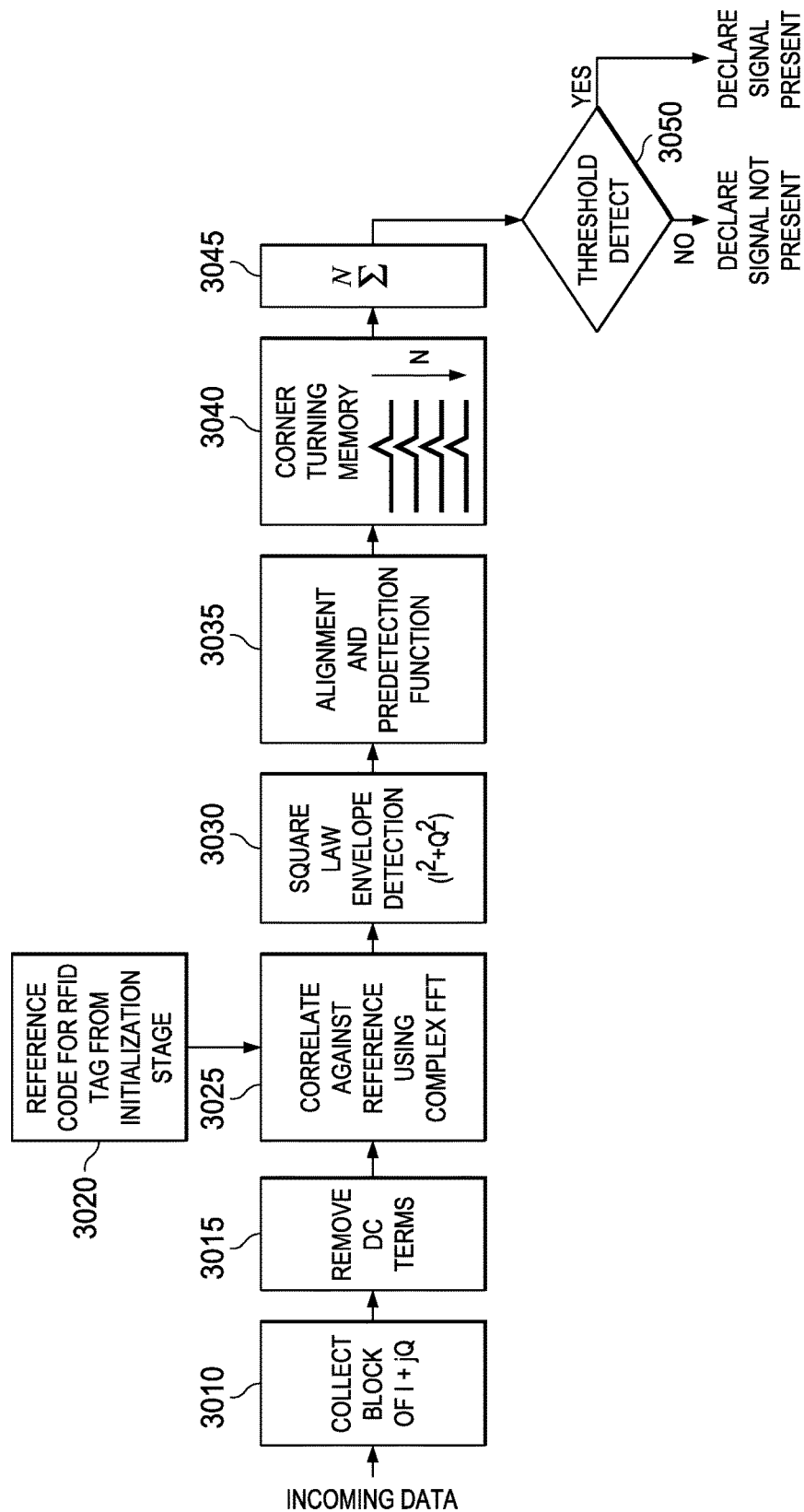
FIG. 30 illustrates a block diagram of an embodiment of a predetecting function operable with a correlation subsystem associated with a control and processing subsystem of an interrogator constructed according to the principles of the present invention.

Turning now to FIG. 30, illustrated is a block diagram of an embodiment of a predetecting function operable with a correlation subsystem associated with a control and processing subsystem of an interrogator constructed according to the principles of the present invention. As mentioned above, multiple correlators in conjunction with the correlation subsystem within an interrogator may be employed to advantage. The multiple correlators can be used to detect multiple RFID tags simultaneously and, in that instance, the multiple correlators typically operate independently. Alternatively, multiple correlators can be assigned to find a single RFID tag wherein each correlator can be given a slightly different area of time or phase space to search. This is especially useful when timing of the response from the RFID tag to a transmit query is not known. Of course, the correlators may be realized in software and/or hardware.

Incoming data is collected as a block of complex I and Q values 3010 followed by removing the DC terms 3015. These values are correlated 3025 against a reference code 3020 using the convolution theorem. Subsequent to correlation, a square law envelope detection function 3030 obtains amplitude information. An alignment and predetection function 3035 follows whose output is then input to the corner turning memory function 3040 followed by the summer 3045 and then a threshold and detection function 3050, of which were discussed above.

It is further within the broad scope of the present invention to employ multiple antennas in accordance with the interrogator and wherein the multiple antennas are employed for diversity and different correlators may be assigned to specific antennas. Under such circumstances, post correlation and/or post averaging results may be combined to provide added detection sensitivity. To perform the aforementioned functions, the interrogator may include multiple RFID sensing subsystems, each with a separate orthogonal input from an antenna(s).

Figure 31:
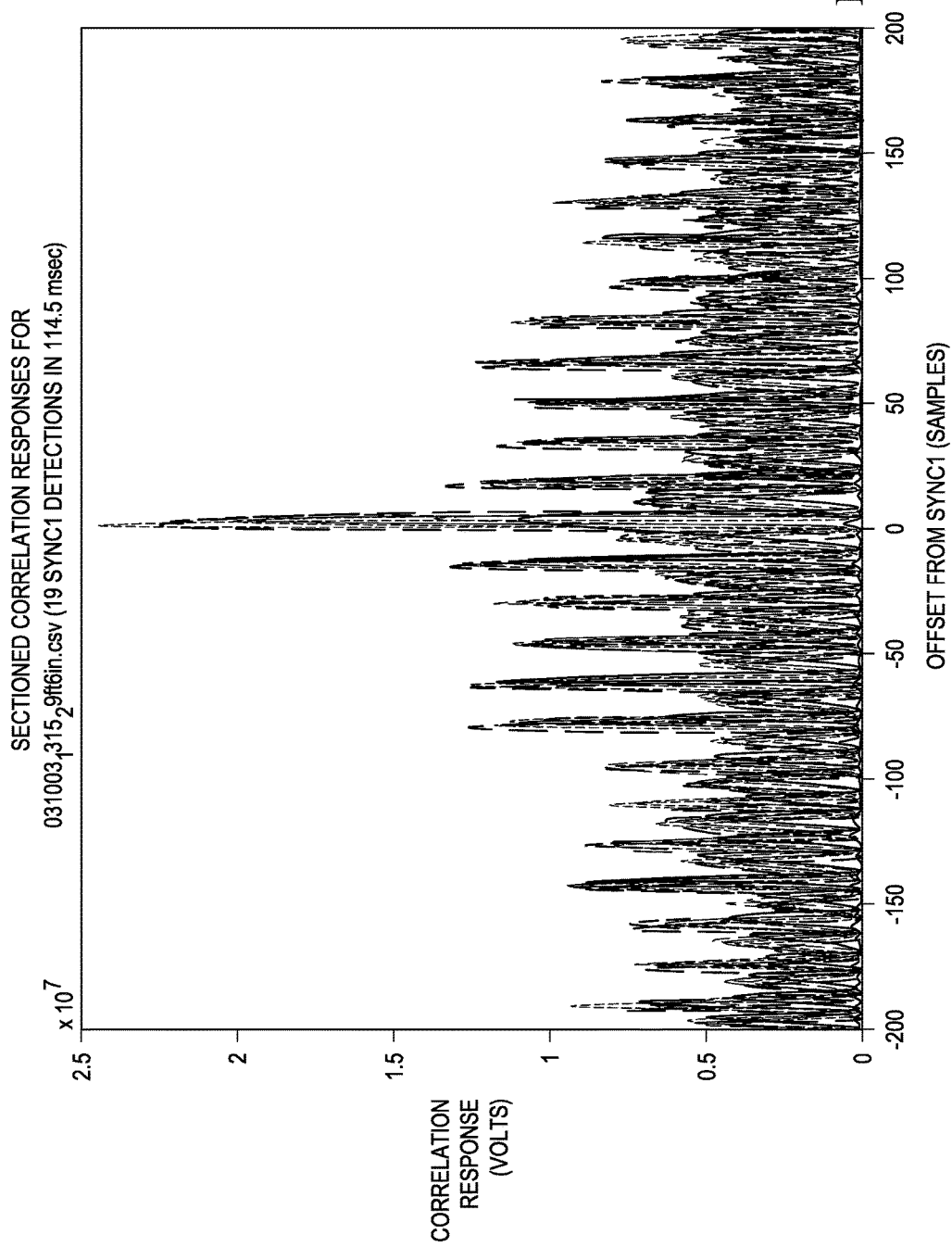
FIGS. 31 to 34 illustrate waveform diagrams demonstrating exemplary performances of an interrogator according to the principles of the present invention.
Figure 32:
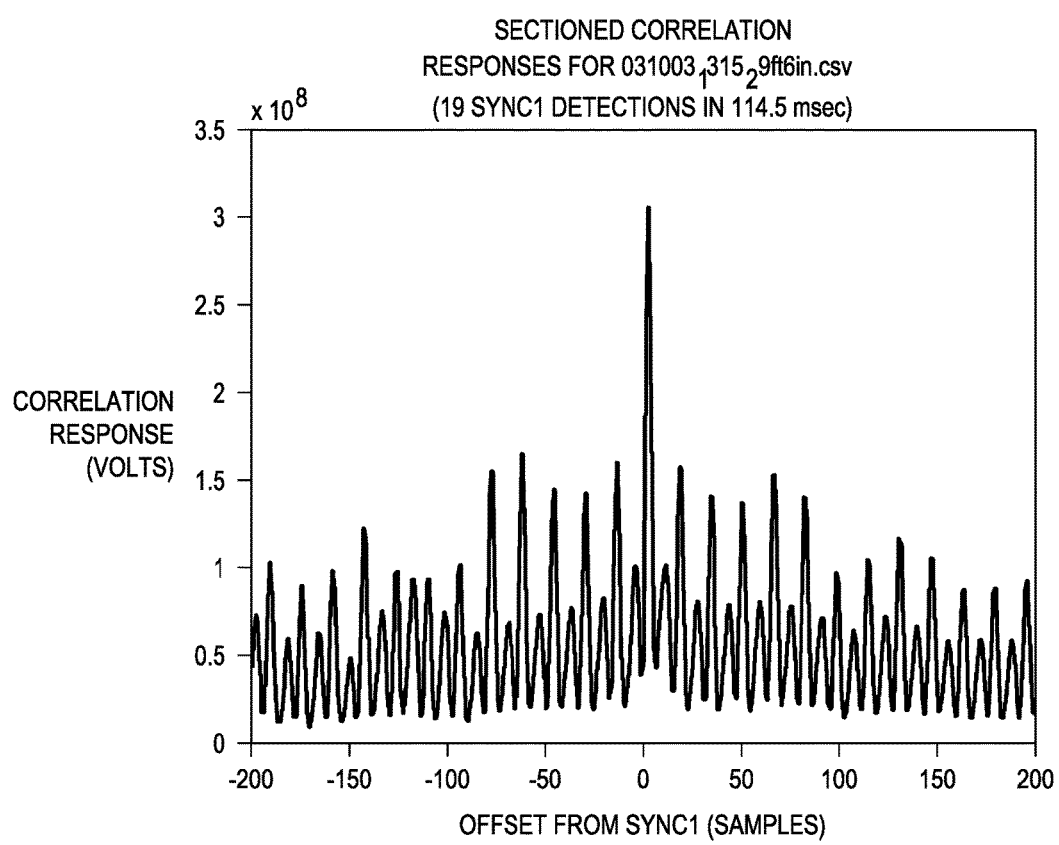
Figure 33:
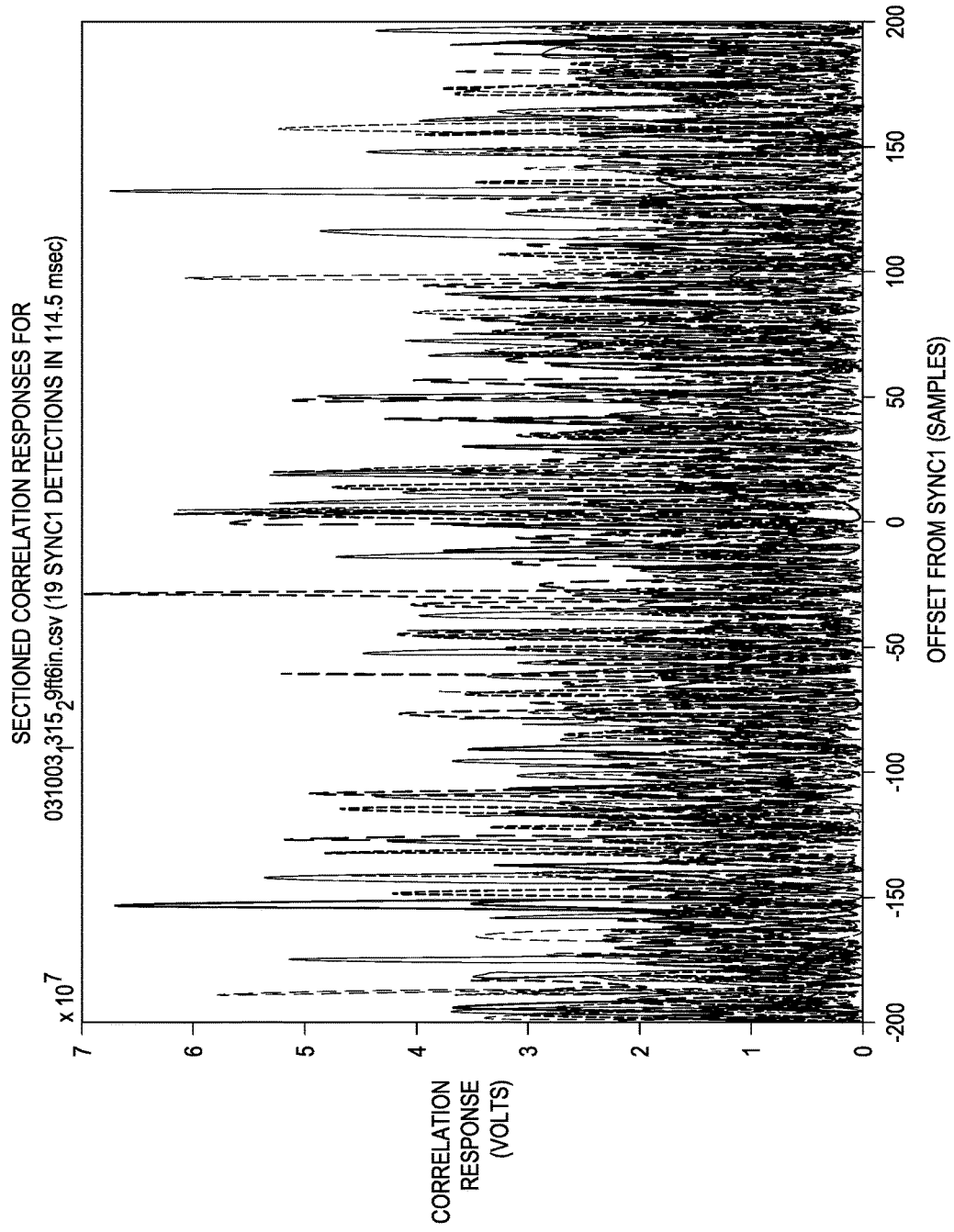
Figure 34:
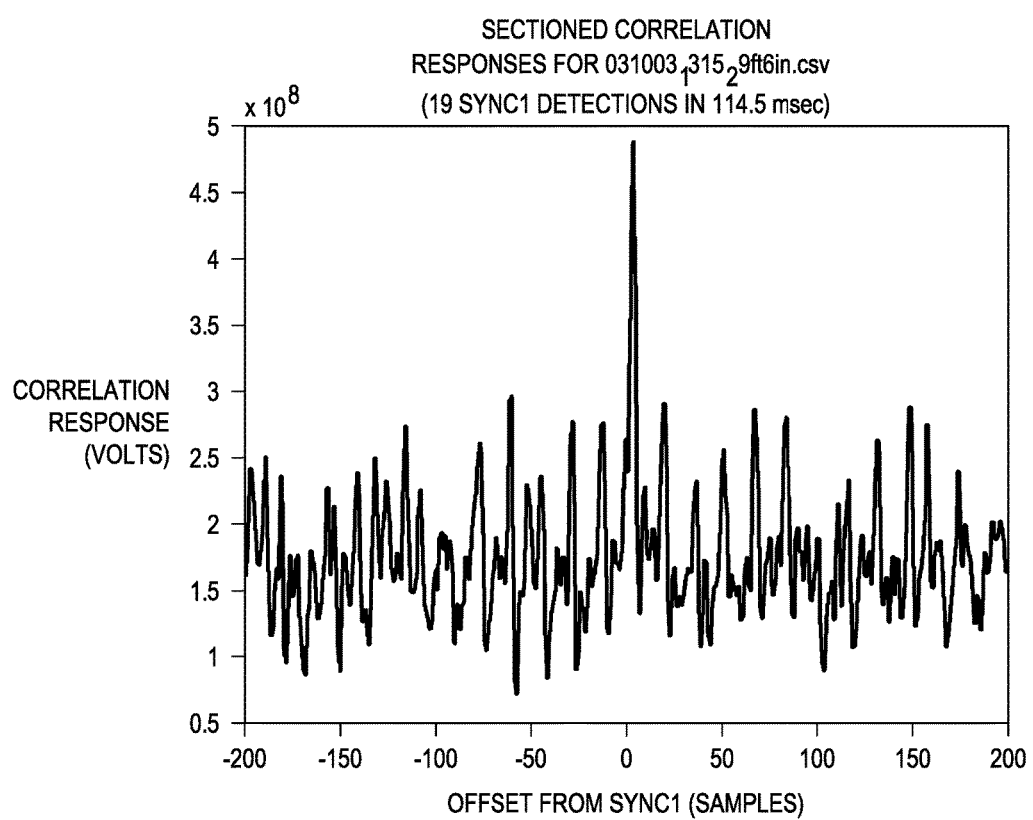

Turning now to FIGS. 31 to 34, illustrated are waveform diagrams demonstrating exemplary performances of an interrogator according to the principles of the present invention. More specifically, FIG. 31 illustrates a correlator response with no averaging for an RFID tag at about 29 feet. It is to be noted that a conventional reader would not typically detect the RFID tag at this distance. These conditions are considered to be docile signal conditions as the SNR is quite large even considering the RFID tag is 29 feet from the interrogator. FIG. 32 illustrates the same conditions as above with the addition of employing a correlation operation with multiple correlations averaged together. Note that the effective noise has been reduced. With respect to FIG. 33, the effect of adding approximately 14 dB of noise to the data and without averaging is demonstrated. The signal is obscured. FIG. 34 shows the results of applying averaging to the previously described conditions for the interrogator. Note that the distinct correlation signature has been restored indicating that even under these extreme conditions, the RFID tag is detected with high reliability.

Exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of applications to identify and detect RFID objects. For instance, in a medical environment, instrument kits including a plurality of RFID objects can be scanned in situ to log the contents thereof into an interrogator and subsequently the instrument kit can be scanned by the interrogator to verify the contents, the integrity of the contents (including expiration dates for time sensitive objects) and the like. The increased sensitivity of the interrogator according to the principles of the present invention opens up many new opportunities (e.g., supply chain management in consumer related retail applications, security applications, etc.) for the interrogation system disclosed herein.

For a better understanding of communication theory and radio frequency identification communication systems, see the following references "RFID Handbook," by Klaus Finkenzeller, published by John Wiley & Sons, Ltd., $2^{nd}$ edition (2003), "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge Mass. 02139-4307, "Introduction to Spread Spectrum Communications," by Roger L. Peterson, et al., Prentice Hall Inc. (1995), "Modern Communications and Spread Spectrum," by George R. Cooper, et al., McGraw-Hill Book Inc. (1986), "An Introduction to Statistical Communication Theory," by John B. Thomas, published by John Wiley & Sons, Ltd. (1995), "Wireless Communications, Principles and Practice," by Theodore S. Rappaport, published by Prentice Hall Inc. (1996), "The Comprehensive Guide to Wireless Technologies," by Lawrence Harte, et al, published by APDG Publishing (1998), "Introduction to Wireless Local Loop," by William Webb, published by Artech Home Publishers (1998) and "The Mobile Communications Handbook," by Jerry D. Gibson, published by CRC Press in cooperation with IEEE Press (1996). For a better understanding of conventional readers, see the following readers, namely, a "MP9320 UHF Long-Range Reader" provided by SAMSYs Technologies, Inc. of Ontario, Canada, a "MR-1824 Sentinel-Prox Medium Range Reader" by Applied Wireless ID of Monsey, N.Y. (see also U.S. Pat. No. 5,594,384 entitled "Enhanced Peak Detector," U.S. Pat. No. 6,377,176 entitled "Metal Compensated Radio Frequency Identification Reader," and U.S. Pat. No. 6,307,517 entitled "Metal Compensated Radio Frequency Identification Reader"), a "2100 UAP Reader," provided by Intermec Technologies Corporation of Everett, Wash. and a "ALR-9780 Reader," provided by Alien Technology Corporation of Morgan Hill, Calif. The aforementioned references, and all references herein, are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to form the devices providing reduced on-resistance, gate drive energy, and costs as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interrogator comprising a control and processing system operable on a processor configured to:
   produce a synthetic reference code including a plurality of bits of a reply code from a radio frequency identification (RFID) tag associated with an RFID object;
   receive a reply including at least a portion of said reply code from said RFID tag in response to an excitation signal;
   correlate said reply with said synthetic reference code to produce a decision signal; and
   compare said decision signal against a threshold to verify a presence of said RFID tag.

2. The interrogator as recited in claim 1 wherein said control and processing system is configured to receive said plurality of bits from a database.

3. The interrogator as recited in claim 2 wherein said database is remote from a location of said interrogator.

4. The interrogator as recited in claim 1 wherein said reply code includes or is associated with information about said RFID object.

5. The interrogator as recited in claim 1 wherein said plurality of bits form at least a portion of a preamble of said reply code.

6. The interrogator as recited in claim 1 wherein said synthetic reference code is produced from said RFID tag during an initialization stage and said reply is correlated with said synthetic reference code after said initialization stage.

7. The interrogator as recited in claim 1 further comprising a keyboard or a data port configured to provide an interface to enter said synthetic reference code.

8. The interrogator as recited in claim 1 wherein each of said plurality of bits includes a plurality of chip bits.

9. The interrogator as recited in claim 1 wherein said control and processing system cannot initially verify said presence of said RFID tag and is further configured to:
   receive another reply including at least a portion of said reply code from said RFID tag in response to another excitation signal;
   correlate said another reply with said synthetic reference code to produce said decision signal, and
   compare said decision signal against said threshold to verify said presence of said RFID tag.

10. The interrogator as recited in claim 1 wherein said control and processing system is configured to uniquely identify for said RFID tag.

11. The interrogator as recited in claim 10 wherein said control and processing system is configured to produce and control an energy of and/or an interrogation period for said excitation signal for said RFID tag.

12. The interrogator as recited in claim 1 wherein said control and processing system is configured to provide a command to control said reply from said RFID tag or another reply from another RFID tag.

13. The interrogator as recited in claim 12 wherein said command is configured to cause said RFID tag or said another RFID tag to be quiet.

14. The interrogator as recited in claim 1 wherein said control and processing system comprises multiple correlators configured to correlate at least one of multiple phases and delay information of said reply with at least one of multiple phases and delay information of said synthetic reference code to produce said decision signal.

15. The interrogator as recited in claim 1 wherein said interrogator is a portable interrogator.

16. A method of operating an interrogator comprising:
   producing a synthetic reference code including a plurality of bits of a reply code from a radio frequency identification (RFID) tag associated with an RFID object;
   receiving a reply including at least a portion of said reply code from said RFID tag in response to an excitation signal;
   correlating said reply with said synthetic reference code to produce a decision signal; and
   comparing said decision signal against a threshold to verify a presence of said RFID tag.

17. The method as recited in claim 16 wherein said reply code includes or is associated with information about said RFID object.

18. The method as recited in claim 16 wherein said method cannot initially verify said presence of said RFID tag and further comprising:
   receiving another reply including at least a portion of said reply code from said RFID tag in response to another excitation signal;
   correlating said another reply with said synthetic reference code to produce said decision signal, and
   comparing said decision signal against said threshold to verify said presence of said RFID tag.

19. The method as recited in claim 16 further comprising producing said excitation signal for said RFID tag and controlling an energy of and/or an interrogation period for said excitation signal for said RFID tag.

20. The method as recited in claim 16 further comprising correlating at least one of multiple phases and delay information of said reply with at least one of multiple phases and delay information of said synthetic reference code to produce said decision signal.

* * * * *